(12) United States Patent
Matsufuji et al.

(10) Patent No.: US 12,109,653 B2
(45) Date of Patent: Oct. 8, 2024

(54) SOLDER ALLOY, SOLDER BALL, SOLDER PASTE, AND SOLDER JOINT

(71) Applicant: Senju Metal Industry Co., Ltd., Tokyo (JP)

(72) Inventors: Takahiro Matsufuji, Tokyo (JP); Shunsaku Yoshikawa, Tokyo (JP); Hiroki Sudo, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 18/224,833

(22) Filed: Jul. 21, 2023

(65) Prior Publication Data

US 2024/0024990 A1    Jan. 25, 2024

(30) Foreign Application Priority Data

Jul. 22, 2022 (JP) ................ 2022-117606

(51) Int. Cl.
*B23K 35/26* (2006.01)
*B23K 35/02* (2006.01)
*C22C 13/02* (2006.01)

(52) U.S. Cl.
CPC ........ *B23K 35/262* (2013.01); *B23K 35/0244* (2013.01); *B23K 35/025* (2013.01); *C22C 13/02* (2013.01)

(58) Field of Classification Search
CPC .................................................. B23K 35/262
See application file for complete search history.

(56) References Cited

U.S. PATENT DOCUMENTS

| | | | |
|---|---|---|---|
| 6,156,132 A | 12/2000 | Yamashita et al. | |
| 6,884,389 B2 | 4/2005 | Takahashi | |
| 9,802,275 B2 | 10/2017 | Ribas et al. | |
| 11,479,835 B2 | 10/2022 | Zhang et al. | |
| 2014/0219711 A1 | 8/2014 | Pandher et al. | |
| 2016/0074971 A1 | 3/2016 | Tachibana et al. | |
| 2020/0070287 A1 | 3/2020 | Mutuku et al. | |
| 2021/0114143 A1 | 4/2021 | Hayashida et al. | |
| 2021/0316406 A1 | 10/2021 | Inaba et al. | |
| 2022/0016733 A1 | 1/2022 | Nishimura | |
| 2022/0362890 A1* | 11/2022 | Mutuku | B23K 35/264 |

FOREIGN PATENT DOCUMENTS

| | | |
|---|---|---|
| CN | 102029479 A | 4/2011 |
| CN | 105195915 A | 12/2015 |
| CN | 108044253 A | 5/2018 |
| CN | 112643241 A | 4/2021 |
| JP | 200417093 A | 1/2004 |
| JP | 200790407 A | 4/2007 |
| JP | 201925538 A | 2/2019 |
| JP | 201984555 A | 6/2019 |
| JP | 2019527145 A | 9/2019 |
| JP | 2023044347 A * | 3/2023 |
| KR | 1020140050090 A | 4/2014 |
| TW | 201538264 A | 10/2015 |
| TW | 202045291 A | 12/2020 |

OTHER PUBLICATIONS

English machine translation of JP 2023-044347 A of Nishimura (Year: 2023).*
Office Action from China National Intellectual Property Administration for related Application No. 202310901258.8 dated Mar. 1, 2024 and an English language translation thereof.

* cited by examiner

*Primary Examiner* — Jophy S. Koshy
(74) *Attorney, Agent, or Firm* — The Webb Law Firm

(57) ABSTRACT

Provided are a solder, a solder alloy, a solder ball, a solder paste, and a solder joint, which have a low melting point, high hardness in a high-temperature environment, heat cycle resistance, and electromigration resistance. The solder alloy has an alloy composition that includes by mass %, Bi: 30 to 60%, Ag: 0.7 to 2.0%, Cu: more than 0% and 1.00% or less, Ni: 0.01 to 1.00%, Sb: 0.2 to 1.5%, with the balance being Sn.

11 Claims, 8 Drawing Sheets

Fig. 3
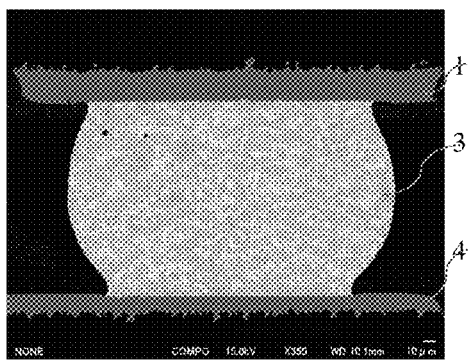
Fig. 3A
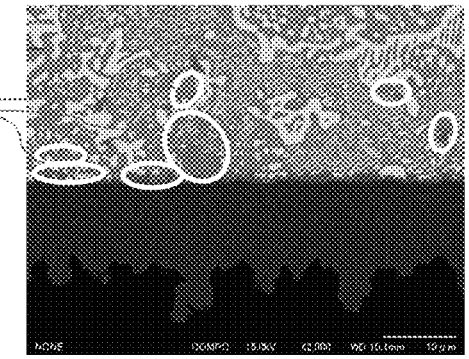
Fig. 3B
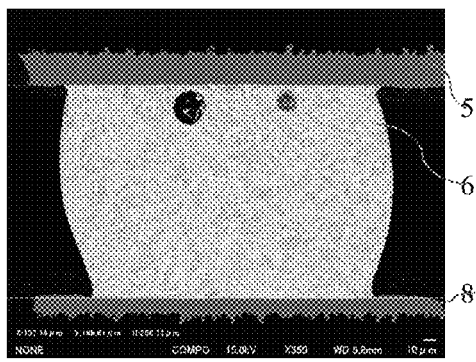
Fig. 3C
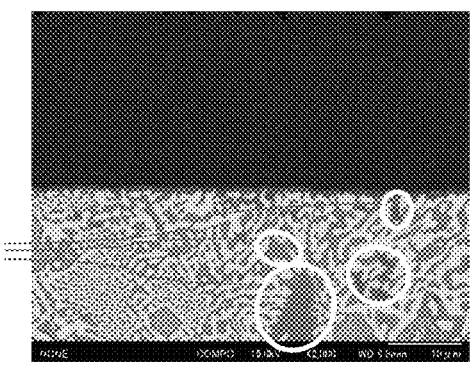
Fig. 3D
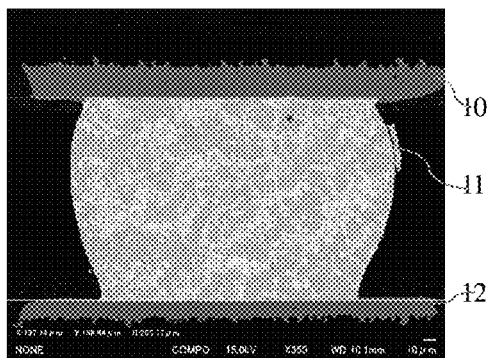
Fig. 3E
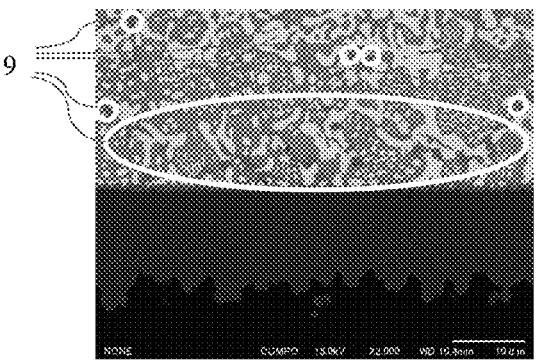
Fig. 3F
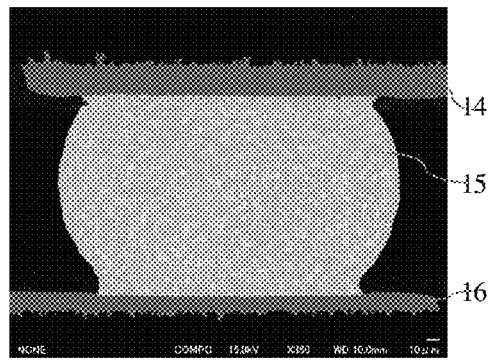
Fig. 3G
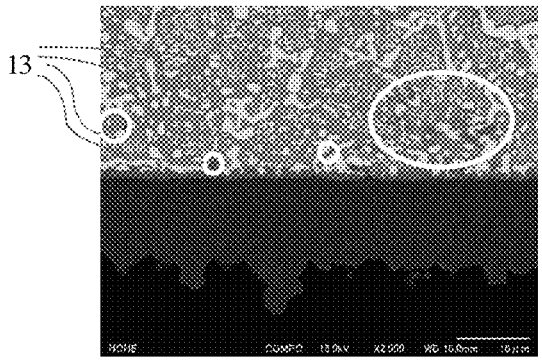
Fig. 3H Fig. 4
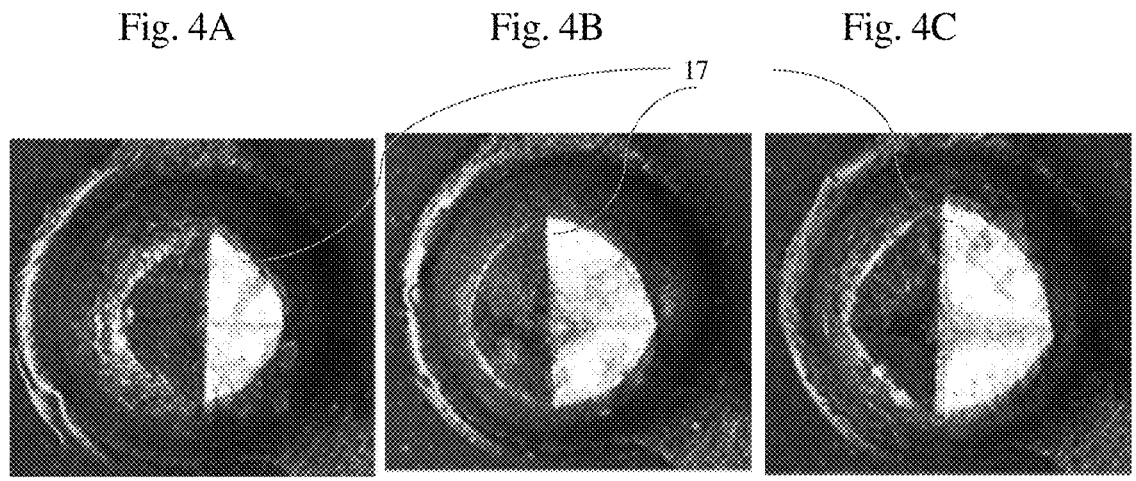
Fig. 4A    Fig. 4B    Fig. 4C
Fig. 5
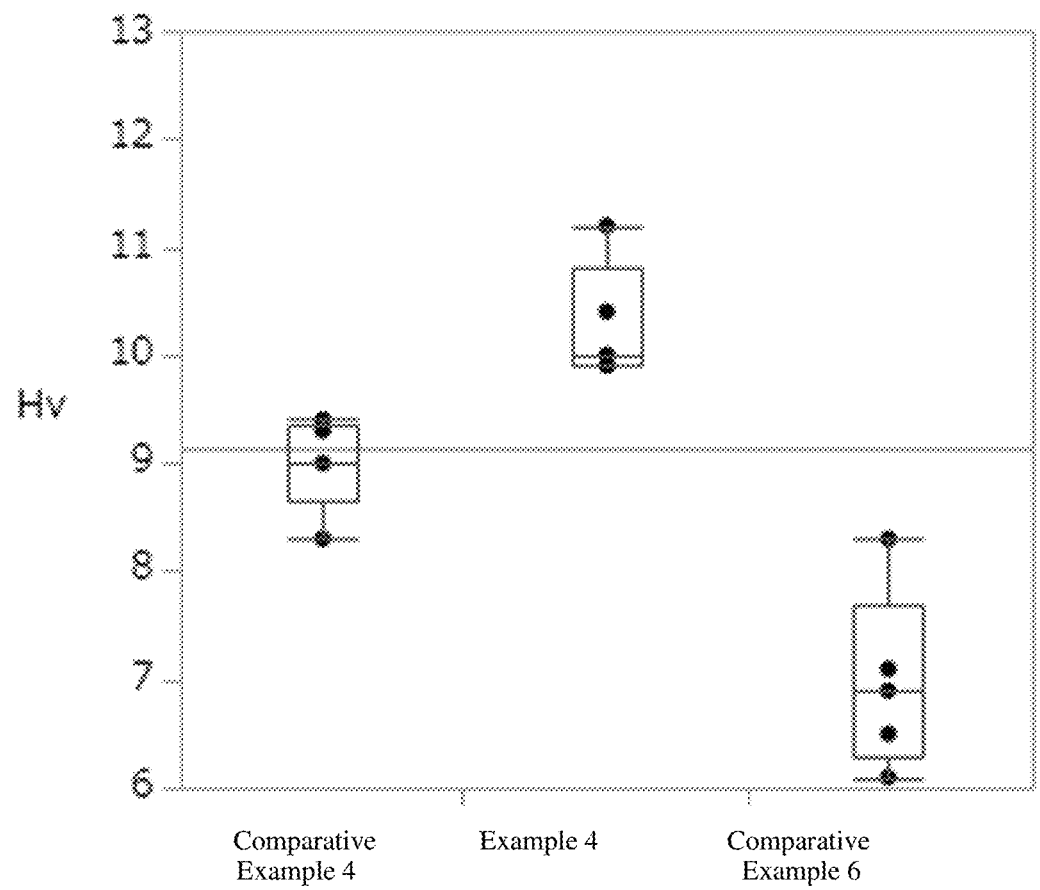

Fig. 9
Fig. 9A
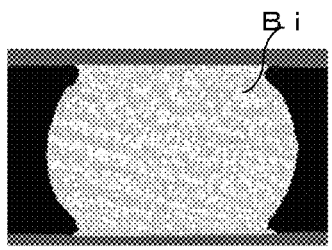
Fig. 9D
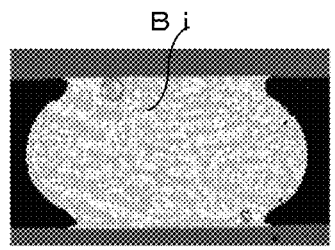
Fig. 9G
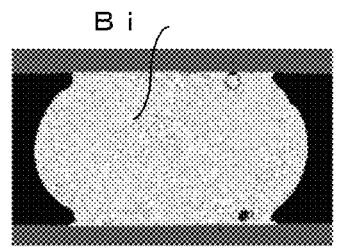
Fig. 9B
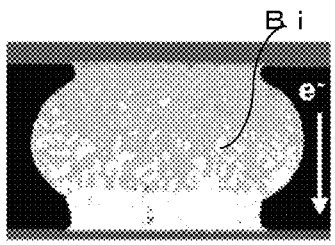
Fig. 9E
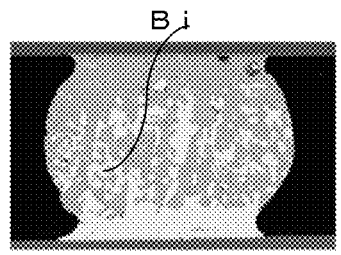
Fig. 9H
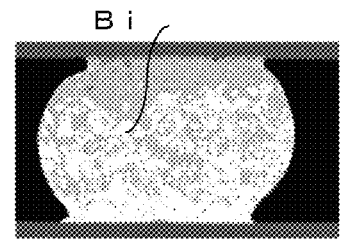
Fig. 9C
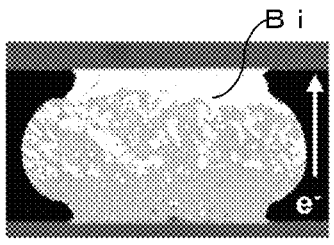
Fig. 9F
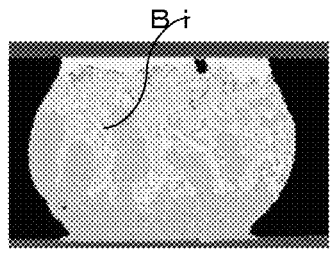
Fig. 9I
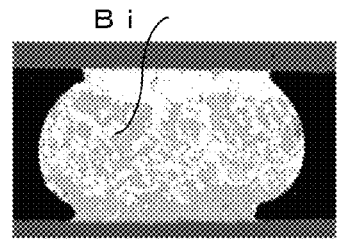

SOLDER ALLOY, SOLDER BALL, SOLDER PASTE, AND SOLDER JOINT

CROSS-REFERENCE TO RELATED APPLICATION

This application claims priority to Japanese Patent Application No. 2022-117606 filed Jul. 22, 2022, the disclosure of which is hereby incorporated by reference in its entirety.

BACKGROUND

Field

The present invention relates to a solder alloy, a solder ball, a solder paste, and a solder joint, with a low melting point.

Description of Related Art

In recent years, downsizing of electronic devices such as CPUs (Central Processing Units) have been required. As an electronic device is downsized, a thermal load during soldering increases, so that soldering at a low temperature has been desired. A lower soldering temperature will enable manufacturing of a highly reliable circuit board. For soldering at a low temperature, a solder alloy with a low melting point must be used.

Examples of low melting point solder alloys include Sn-58Bi and Sn-52In, as disclosed in JISZ3282 (2017). These alloys have melting temperatures of respectively 139° C. and 119° C., and both have alloy compositions representing solders with low melting points. In particular, Sn-58Bi has been widely used as a low-cost solder alloy.

However, during solidification of the above-described Sn—Bi solder alloy with a high content of Bi, Bi segregates in Sn and coarse Bi phases precipitate. The Bi phases exhibit hard and brittle properties, and may deteriorate the mechanical properties such as the ductility of the solder alloy. Therefore, in order to suppress an increase in melting point and improve the mechanical properties, various solder alloys have been investigated.

For example, Patent document 1 discloses a solder alloy obtained by improving the ductility, thermal fatigue resistance, creep resistance, and drop impact resistance of the Sn—Bi solder alloy by structural refinement. In order to improve these mechanical properties, the same document discloses that the solder alloy may contain Ag, Cu, Sb, and Ni, etc.

Patent document 2 discloses a solder alloy having fine crystal grains and improved in wet-spreading properties, tensile strength, and vibration resistance. In order to improve these properties, the same document discloses that, by using the fact that Bi and Si form an all-proportional solid solution, contents of these have a predetermined relationship. In addition, the same document discloses that, after producing an intermediate alloy of Bi and Sb, by melting the intermediate alloy together with an intermediate alloy of Sn—Cu, Sn—Ag, and Sn—Ni, etc., a predetermined solder alloy is produced.

CITATION LIST

Patent Document

US Patent Application Publication No. 2020/0070287
Japanese Unexamined Patent Application Publication (Translation of PCT Application) No. 2019-527145

SUMMARY

As described above, in Patent documents 1 and 2, improvements in mechanical properties, etc., by refinement of the alloy structure are described. One of the reasons for the improvements in mechanical properties by refinement of the alloy structure is relaxation of stress to be applied to the solder alloy. As the alloy structure is refined, the area of the crystal grain boundary increases, so that stress is easily relaxed. As the crystal grain size is small, stress per grain relatively increases, so that the crystal grain easily deforms, and the stress is relaxed.

However, according to downsizing of electronic devices in recent years, solder bumps to be formed on electrodes also become smaller, so that the solder bumps easily deform more than necessary, and eventually, the mechanical properties required as a solder joint may deteriorate. Patent document 1 describes that the ductility is improved by refinement of the alloy structure, and accordingly, the drop impact resistance is improved, however, as the ductility is high, even when an electronic device joined to a substrate is displaced due to deformation of a solder alloy constituting solder joints, an electrically conductive state is maintained in some cases. However, there is concern that deformation of an electric conductive pathway degrades the mechanical and electrical reliabilities, and high hardness in a high-temperature environment has also been required.

In the case where the ductility is high, when the electronic device is displaced by an external stress, the sectional area of the solder alloy constituting a solder joint decreases. Accordingly, the Joule heat generated in the solder joint increases, and may adversely affect the electronic device thermally. Therefore, high hardness in a high-temperature environment is considered to be necessary.

Further, according to expansion in use application of a solder with a low melting point, the application thereof is expanded to bumps of the inside of electronic components and CPUs. Under this situation, in consideration of manufacturing and shipment of these components, securing of strength is considered to be necessary to prevent deterioration at the time of an inspection before shipment and improve storage stability.

Patent document 2 discloses that, since Sb and Bi formed an all-proportional solid solution, Sb dissolved in the Bi phase structure during solidification, and exhibited a fine BiSb laminar distribution, and the alloy brittleness problem caused by Bi phase assemblage was structurally reliably solved. However, in response to the fact that the brittleness of the solder alloy becomes a problem and deteriorates the mechanical properties, in recent electronic devices which have been significantly downsized, when the ductility is improved to avoid the brittleness, as described above, the improvement in ductility may cause a problem.

Electronic devices have been used as vehicle-mounted devices, and solder joints must be prevented from being ruptured even when exposed to a harsh environment with extreme temperature changes. In order to prevent rupture of solder joints, it is considered that, as a solder alloy has higher ductility and tensile strength, the solder is more excellent in heat cycle resistance. However, the conventional technologies in which investigations have been made only for improving the ductility and tensile strength cause harmful effects as described above.

In recent years, according to improvements in performance of electronic devices, a current density to be conducted to a solder joint has dramatically increased. An increase in current density causes electromigration in the solder joint in some cases. As the electromigration progresses, the solder joint ruptures, or electrical properties are deteriorated due to an increase in resistance value.

Here, the electromigration (hereinafter, referred to as "EM" as needed) is the following phenomenon. First, atoms constituting the solder joint collide with electrons that generate a current, and the momentum is transmitted from the electrons to the atoms. The atoms that have obtained the momentum in an electron flowing direction migrate along the flow of the electrons to the anode side of the solder joint. At this time, in the solder alloy consisting primarily of Sn, Bi and Sn migrate in this order and segregate at the anode side, and an empty lattice is generated at the cathode side of the solder joint. Such an empty lattice gradually expands and generates a void. As the void grows, the resistance value rises, and eventually, the solder joint ruptures.

On the other hand, in an Sn—Bi solder alloy with a Bi content of more than several tens of percent, contrary to the behavior of a solder alloy having a Bi content of several percent and consisting primarily of Sn, Bi segregates at the anode side, and Sn segregates at the cathode side. The Bi segregation layer causes a brittleness increase, conductivity deterioration, and a Joule heat increase, and deteriorates the mechanical reliability and the electrical properties of the joined portion. The Si—Bi solder alloy has properties in which EM easily progresses even in a lower-temperature environment or a lower-current environment as compared with the solder alloy consisting primarily of Sn. In recent years, due to a growing demand for further miniaturization and higher-current environment of electronic components, the EM has become a big problem, and in particular, reduction of the risk of EM is essential for the Sn—Bi solder alloy.

An objective of the present invention is to provide a solder alloy, a solder ball, a solder paste, and a solder joint, which have a low melting point, high hardness in a high-temperature environment, heat cycle resistance, and electromigration resistance.

In the Sn—Bi solder alloy with a low melting point, instead of pursuing high ductility as in the conventional case, the inventors investigated additive elements necessary for realizing both of high hardness in a high-temperature environment and heat cycle resistance. It is considered that, even when the Bi content in the Sn—Bi solder alloy slightly deviates from the eutectic composition, Bi segregates and the solder alloy becomes brittle, and accordingly, the hardness deteriorates, and the heat cycle resistance also deteriorates.

Therefore, the inventors focused on the fact that formation of a hard and homogeneous intermetallic compound with a high melting point in the solder alloy is effective to suppress a hardness decrease in a high-temperature environment caused by Bi segregation and realize excellent heat cycle resistance. In order to improve the hardness in a high-temperature environment, a crystal phase with a high melting point needs to be precipitated in the solder alloy. In addition, in order to avoid rupture of a joint interface in a solder joint, growth of the crystal phase formed at the joint interface needs to be suppressed.

In the present invention, in order to improve the heat cycle resistance, the creep properties need to be improved. The creep properties are usually evaluated by applying a predetermined stress to a sample at a room temperature, and measuring a time to rupture. However, at the time of heat cycle, a stress to be applied to a solder joint is presumed to be greater in a high-temperature environment than in a low-temperature environment. Therefore, in order to improve the creep properties at the time of heat cycle, a secondary creep rates in a creep curve in a high-temperature environment needs to be decreased. Therefore, in the Sn—Bi solder alloy, by focusing on precipitation of a crystal phase with a high melting point and a decrease of the secondary creep rates as a minimum creep rate in a high-temperature environment, the inventors selected additive elements and investigated their contents.

As a result, Ag, Sb, Cu, and Ni were selected as elements forming intermetallic compounds with Sn. Ag forms $Ag_3Sn$, and Sb forms SbSn. Cu forms a compound layer of $Cu_6Sn_5$, etc., at the joint interface, and Ni forms fine $(Cu, Ni)_6Sn_5$ by substitution by Cu. However, even when these are randomly formed in the solder alloy and at the joint interface, it is difficult to realize both of high hardness in a high-temperature environment and heat cycle resistance. In the case of a solder alloy with low hardness, a pin to be used for a high-temperature pin contact test for measuring the performance of a semiconductor component easily sticks in the solder alloy, and may cause a problem in the subsequent process of mounting the component after the test.

In more detail, concerning Ag, in order to suppress an increase in melting point, the content of Ag was adjusted so that $Ag_3Sn$ precipitated as a primary crystal in the vicinity of a eutectic composition when molten solder was cooled. Concerning Sb, as with Ag, the content thereof was adjusted so that an increase in liquidus-line temperature was avoided as far as possible, and at a room temperature, SbSn was formed and the secondary creep rates decreased, and the heat cycle resistance was improved. Concerning Cu, the content thereof was adjusted to form a thin compound layer of $Cu_6Sn_5$, etc. Concerning Ni, the content thereof was adjusted so that, by refining $Cu_6Sn_5$, posterior growth was suppressed even after a solder joint was formed.

The inventors gained finding that, as the contents of the respective constituent elements were adjusted as described above so that precipitations of various intermetallic compounds were controlled, $Ag_3Sn$ and SbSn appropriately precipitated, and in addition, even Bi segregation could be suppressed, and variation in crystal grain size became small. Accordingly, finding that the structure of the solder alloy could be homogenized was gained.

Further, concerning the Sn—Bi solder alloy with a low melting point, the inventors investigated an alloy structure that exhibited EM resistance in addition to high hardness and excellent heat cycle resistance. Accordingly, finding that even when the Bi content in the Sn—Bi solder alloy deviated from the eutectic composition, the Bi segregation behavior itself was not inhibited, and the EM resistance was deteriorated was obtained. Therefore, as means to block Bi segregation in the Sn—Bi solder alloy, the inventors focused on the fact that, as long as an intermetallic compound with Sn was homogeneously formed in the solder alloy, the intermetallic compound did not have to be made excessively finer, and the solder alloy exhibited excellent EM resistance even when the crystal grain size was slightly large.

As described above, when focusing on high hardness and excellent heat cycle resistance, structural homogenization was realized to some degree. However, finding that occurrence of EM could not be sufficiently suppressed by adjustment of the alloy structure focused only on mechanical properties and heat cycle resistance, was gained. When an intermetallic compound to precipitate is fine, the Sn—Bi solder structure also easily assumes a complicated fine structure. A grain boundary increase by simple refinement of the metallic structure accelerates EM as an atomic transport phenomenon, and addition of an element may appear as an unintended negative action. Therefore, in order to prevent the crystal grain size distribution from becoming narrower and prevent the crystal grain size from becoming excessively fine, through investigation of the EM delay effect of the intermetallic compound species and investigation of the balance of refinement and homogenization effects of respective elements on the solder structure, further detailed adjustment was made. As a result, a solder alloy structure which realized both of securing appropriate homogeneity and mechanical properties of the solder alloy structure, and EM suppressing power by a compound, and had EM resistance improved by delaying Bi segregation when being energized, was obtained, and the present invention was completed.

The present invention obtained from these findings is as follows.

(0) A solder alloy consisting of, by mass %,
Bi: 30 to 60%,
Ag: 0.7 to 2.0%,
Cu: more than 0% and 1.00% or less,
Ni: 0.01 to 1.00%,
Sb: 0.2 to 1.5%, with the balance being Sn.

(1) A solder alloy having an alloy composition consisting of, by mass %,
Bi: 30 to 60%,
Ag: 0.7 to 2.0%,
Cu: more than 0% and 1.00% or less,
Ni: 0.01 to 1.00%,
Sb: 0.2 to 1.5%, with the balance being Sn.

(2) The solder alloy according to (0) or (1) above, wherein, by mass %,
the alloy composition further comprises at least one of P, Ge, Ga, and As: 0.1% or less in total.

(3) The solder alloy according to any one of (0) to (3) above, wherein, by mass %,
the alloy composition further comprises at least one of Fe and Co: 0.1% or less in total.

(4) The solder alloy according to any one of (0) to (3) above, wherein, by mass %,
the alloy composition further comprises Pd: 0.1% or less.

(5) The solder alloy according to any one of (0) to (4) above, wherein, by mass %,
the alloy composition further comprises Zr: 0.1% or less.

(6) The solder alloy according to any one of (0) to (5) above, wherein, by mass %,
the alloy composition further comprises Zn: 0.1% or less.

(7) The solder alloy according to any one of (0) to (6) above, wherein, by mass %,
the alloy composition further comprises Pb: less than 0.02%.

(8) The solder alloy according to (0) or (1), wherein, by mass %,
the alloy composition further comprises at least one selected from the group consisting of,
at least one of, P: less than 0.01%, Ge: 0.01% or less, Ga: less than 0.01%, and As: more than 0.001% and 0.01% or less, Co: less than 0.01%,
Pd: 0.01% or less, and
Pb: less than 0.004%.

(9) The solder alloy according to any one of (0) to (8) above,
wherein the alloy composition satisfies at least one of the following relations (1) to (3):

$$13.00 \leq Bi/(Ag+Cu+Ni+Sb) \leq 23.27 \quad \text{Relation (1)}$$

$$0.017 \leq (Ag+Cu+Ni)/Sn \leq 0.039 \quad \text{Relation (2)}$$

$$70.9 \leq (Bi+Ag+Sb)/(Cu+Ni) \leq 6349 \quad \text{Relation (3)}$$

wherein Sn, Bi, Ag, Cu, Ni, and Sb in the relations (1) to (3) each represent the contents (mass %) thereof in the solder alloy.

(10) A solder ball consisting of the solder alloy according to anyone of (0) to (9) above.

(11) A solder paste comprising the solder powder consisting of the solder alloy according to any one of (0) to (9) above.

(12) A solder joint comprising the solder alloy according to anyone of (0) to (9) above.

BRIEF DESCRIPTION OF THE DRAWINGS

FIG. 3 is cross-sectional photographs of solder joints made of solder balls having alloy compositions of Example 4, Example 7, Comparative Example 4, and Comparative Example 5, FIG. 3A is a cross-sectional photograph of Example 4 taken at a magnification of 350, FIG. 3B is a cross-sectional photograph of Example 4 taken at a magnification of 2000, FIG. 3C is a cross-sectional photograph of Example 7 taken at a magnification of 350, FIG. 3D is a cross-sectional photograph of Example 7 taken at a magnification of 2000, FIG. 3E is a cross-sectional photograph of Comparative Example 4 taken at a magnification of 350, FIG. 3F is a cross-sectional photograph of Comparative Example 4 taken at a magnification of 2000, FIG. 3G is a cross-sectional photograph of Comparative Example 5 taken at a magnification of 350, and FIG. 3H is a cross-sectional photograph of Comparative Example 5 taken at a magnification of 2000.

FIG. 4 is top face photographs of samples of solder bumps made of solder alloys of Example 4, Comparative Example 4, and Comparative Example 6, subjected to Vickers hardness measurement, FIG. 4A is Example 4, FIG. 4B is Comparative Example 4, and FIG. 4C is Comparative Example 6.

FIG. 5 is a diagram illustrating Vickers hardness measurement results of Comparative Example 4, Example 4, and Comparative Example 6.

FIG. 9 is cross-sectional photographs before and after EM resistance tests of solder joints made of solder balls having alloy compositions of Example 4, Example 28, and Comparative Example 4, FIG. 9A is a cross-sectional photograph of Comparative Example 4 before energization, FIGS. 9B and 9C are cross-sectional photographs of Comparative Example 4 after 700-hour energization, FIG. 9D is a cross-sectional photograph of Example 4 before energization, FIGS. 9E and 9F are cross-sectional photographs of Example 4 after 700-hour energization, FIG. 9G is a cross-sectional photograph of Example 28 before energization, and FIGS. 9H and 9I are cross-sectional photographs of Example 28 after 700-hour energization.

DETAILED DESCRIPTION

Figure 1:
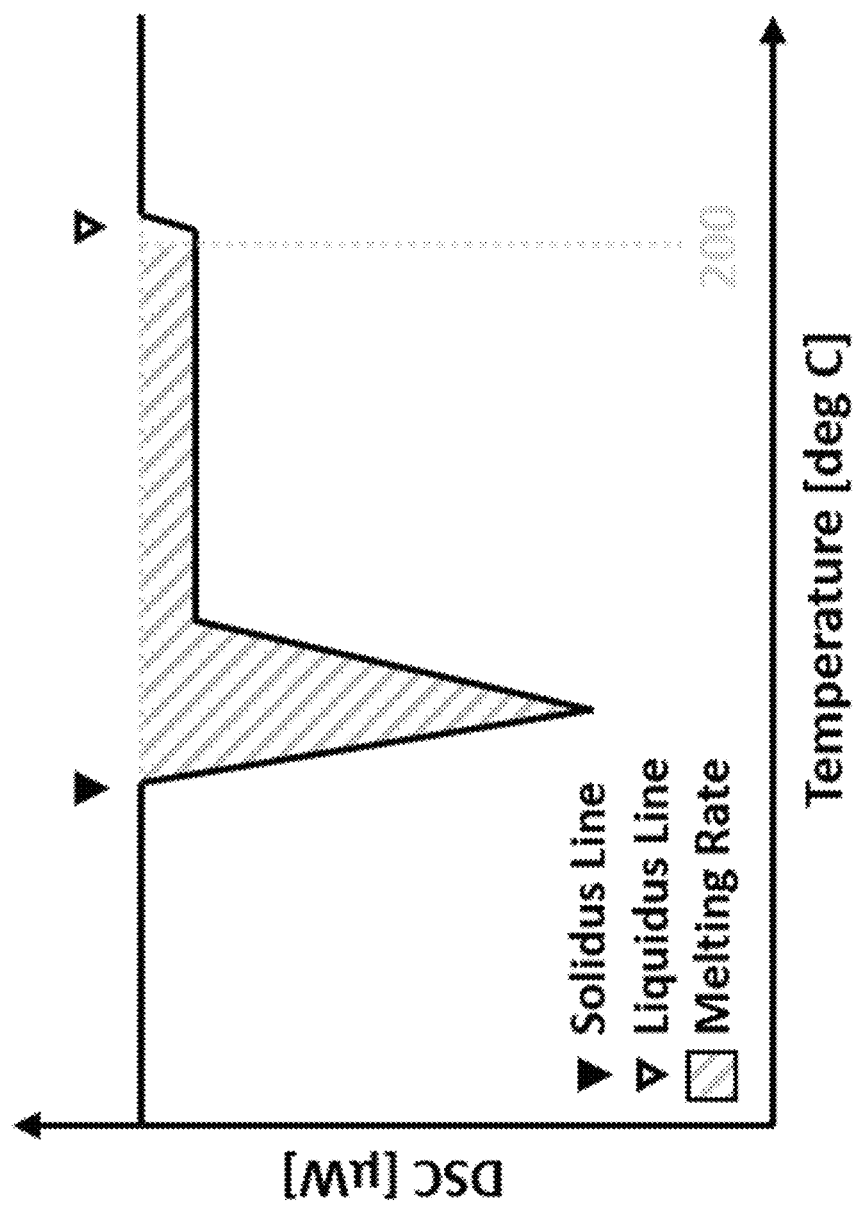
FIG. 1 is a schematic diagram of a melting curve obtained by DSC.

The present invention is described in more detail below. In the present description, "%" relating to the solder alloy composition refers to "mass %" unless otherwise specified. In the solder alloy of the present application, Bi, Ag, Cu, Ni, and Sb are essential elements, and P, Ge, Ga, As, Fe, Co, Pd, Zr, Zn, and Pb are optional elements.

1. Alloy Composition of Solder Alloy (1) Bi: 30 to 60%

Bi is an element which is added to decrease a melting point of a solder alloy, and has a correlation to hardness and heat cycle resistance of the solder alloy. In addition, Bi can adjust the electric conductivity of a solder alloy. A melting point of Sn—Bi eutectic alloy is as low as 139° C., and the content described above is over the solid solubility limit in Sn, so that Bi appropriately precipitates in the Sn matrix.

The Bi content of less than 30% increases the melting point and hinders the aimed at low-melting-point mounting. In addition, the heat cycle resistance deteriorates. As described later, the hardness and the heat cycle resistance are improved to some degree by adding Ag and Sb, however, an excessive increase in content of Ag and/or Sb causes the alloy structure to become inhomogeneous, and induces a melting point increase, so that, in the present invention, sufficient improvements cannot be obtained only by addition of Ag and Sb. In terms of the lower limit, the Bi content is 30% or more, preferably 35% or more, more preferably 36% or more, and further preferably 40% or more. On the other hand, a Bi content of more than 60% causes the alloy structure to become inhomogeneous due to Bi segregation, and causes significant embrittlement and deteriorates the hardness. Along with this, the pin contact property also deteriorates. In terms of the upper limit, the Bi content is 60% or less, preferably 58% or less, more preferably 50% or less, and further preferably 45% or less.

When emphasis is put on the heat cycle resistance, in terms of the lower limit, the Bi content is 30% or more, preferably 35% or more, more preferably 36% or more, further preferably 40% or more, particularly preferably 45% or more, and most preferably 50% or more. In terms of the upper limit, the Bi content is 60% or less, preferably 58% or less.

Bi greatly contributes to the creep rate in a high-temperature environment. The secondary creep rates as a minimum creep rate in a high-temperature environment may change according to the Bi content. Therefore, the hardness and the heat cycle resistance may be further improved when the creep rate is appropriate according to the Bi content. In the present invention, there is a preferred relationship between the Bi content and ((creep rate)/(Bi content (mass %))).

When the Bi content is 42.0% or less, the value of ((creep rate)/(Bi content (mass %))) is preferably 0.25 or less, more preferably 0.24 or less, further preferably 0.23 or less, particularly preferably 0.22 or less, and most preferably 0.21 or less, and may be 0.20 or less, 0.19 or less, and 0.18 or less.

When the Bi content is more than 42.0% and 50% or less, the value of ((creep rate)/(Bi content (mass %))) is preferably 0.15 or less, more preferably 0.13 or less, further preferably 0.10 or less, and particularly preferably 0.08 or less. When the Bi content is more than 50.0% and 62% or less, the value of ((creep rate)/(Bi content (mass %))) is preferably 0.05 or less, more preferably 0.03 or less, and further preferably 0.02 or less. The lower limit of ((creep rate)/(Bi content (mass %))) has to be 0.001 or more regardless of the Bi content. When the alloy composition is within the scope of the present invention, and ((creep rate)/(Bi content (mass %))) is within the range described above, excellent hardness and heat cycle resistance are exhibited.

(2) Ag: 0.7 to 2.0%

Ag is an element that improves the wettability with electrodes, and increases the hardness in a high-temperature environment by precipitation of $Ag_3Sn$. Since an appropriate Ag content causes formation of a homogeneous alloy structure, this decreases the secondary creep rates and improves the heat cycle resistance. In addition, Ag is an element that also improves the EM resistance since it blocks Bi segregation. Further, an appropriate Ag content contributes to an improvement in electric conductivity.

The Ag content of less than 0.7% causes an insufficient precipitation amount of $Ag_3Sn$, and deteriorates the hardness in a high-temperature environment and the heat cycle resistance. Along with this, the pin contact property also deteriorates. In addition, Bi segregation is hardly inhibited, so that the EM resistance deteriorates. In terms of the lower limit, the Ag content is 0.7% or more, preferably 0.8% or more, more preferably 0.9% or more, and further preferably 1.0% or more. On the other hand, an Ag content of more than 2.0% causes a large precipitation amount of $Ag_3Sn$, and accordingly, the alloy structure becomes inhomogeneous, and the melting point increases. Further, the heat cycle resistance deteriorates. In terms of the upper limit, the Ag content is 2.0% or less, preferably 1.5% or less, more preferably 1.3% or less, and further preferably 1.2% or less.

(3) Cu: More than 0% and 1.00% or Less

Cu prevents dissolution of electrodes, etc., including Cu, and forms a compound layer of $Cu_6Sn_5$, etc., at a joint interface, and can improve the heat cycle resistance by suppressing posterior growth of a compound composing the compound layer. In a case where the Cu content is 0%, even when a Cu electrode is used, a compound layer of $Cu_6Sn_5$ cannot be formed to a degree sufficient to suppress the posterior growth, and the heat cycle resistance deteriorates. In terms of the lower limit, the Cu content is more than 0%, preferably 0.01% or more, more preferably 0.05% or more, further preferably 0.10% or more, particularly preferably 0.20% or more, and most preferably 0.30% or more. On the other hand, the Cu content of more than 1.00% may cause a coarse intermetallic compound to precipitate, deteriorate the homogeneity of the alloy structure, and cause an increase in melting point. In terms of the upper limit, the Cu content is 1.00% or less, preferably 0.80% or less, more preferably 0.70% or less, particularly preferably 0.60% or less, and most preferably 0.50% or less.

(4) Ni: 0.01 to 1.00%

Ni is an element that assumes a form of $(Cu, Ni)_6Sn_5$ by partially substituting Cu of a $Cu_6Sn_5$-based compound formed at a joint interface, and can suppress growth of this compound after forming a solder joint, and thereby improves the heat cycle resistance. A Ni content of less than 0.01% causes an insufficient precipitation amount of $(Cu, Ni)_6Sn_5$, cannot suppress growth of the compound, and deteriorates the heat cycle resistance. In terms of the lower limit, the Ni content is 0.01% or more, preferably 0.02% or more, and more preferably 0.03% or more. On the other hand, the Ni content of more than 1.00% may cause precipitation of a coarse intermetallic compound and deteriorate the homogeneity of the alloy structure, and causes an increase in melting point. In terms of the upper limit, the Ni content is 1.00% or less, preferably 0.80% or less, more preferably 0.50% or less, further preferably 0.30% or less, particularly preferably 0.10% or less, and most preferably 0.05% or less.

(5) Sb: 0.2 to 1.5%

As with Ag, Sb is an element that can improve the EM resistance as well as the hardness and the heat cycle resistance. Sb can also improve the pin contact property. Sb causes precipitation of a hard SbSn compound with a high melting point, so that by combination with Ag, high hardness can be more stably secured in a high-temperature environment. As an appropriate Sb content is added to a solder alloy with the Ag content falling within the above-described range, the secondary creep rates decreases, and the heat cycle resistance is improved. Further, along with formation of a homogeneous alloy structure, Bi segregation is blocked, so that migration of Sn is suppressed, and the EM resistance is also improved.

The Sb content of less than 0.2% causes an insufficient precipitation amount of SnSb, so that the hardness deteriorates. According to this, the pin contact property also deteriorates. In terms of the lower limit, the Sb content is 0.2% or more, preferably 0.3% or more, more preferably 0.4% or more, and further preferably 0.5% or more. On the other hand, the Sb content of more than 1.5% may cause precipitation of a coarse intermetallic compound and deteriorate the homogeneity of the alloy structure, and excessive addition of Sb causes an increase in melting point. In terms of the upper limit, the Sb content is 1.5% or less, preferably 1.3% or less, more preferably 1.0% or less, further preferably 0.8% or less, particularly preferably 0.7% or less, and most preferably 0.6% or less.

(6) At Least One of Relations (1) to (3)

$$13.00 \leq Bi/(Ag+Cu+Ni+Sb) \leq 23.27 \quad \text{Relation (1)}$$

$$0.017 \leq (Ag+Cu+Ni)/Sn \leq 0.039 \quad \text{Relation (2)}$$

$$70.9 \leq (Bi+Ag+Sb)/(Cu+Ni) \leq 6349 \quad \text{Relation (3)}$$

Sn, Bi, Ag, Cu, Ni, and Sb in the relations (1) to (3) each represent the contents (mass %) thereof in the solder alloy.

It is preferable that the solder alloy according to the present invention satisfies at least one of the relations (1) to (3) when the respective constituent elements are within the above-described ranges. In the relation (1), the balance between Bi which is essential as a solder alloy with a low melting point and the other additive elements is considered. By satisfying the relation (1), various effects of the solder alloy according to the present invention, such as suppression of intermetallic compound coarsening, hardness, heat cycle resistance, and EM resistance can be concurrently exerted. In the relation (2), the balance between a total content of a group of elements having a risk for causing coarsening of an intermetallic compound when their contents are excessively large, and a content of Sn forming a compound together with the element group, is considered. By satisfying the relation (2), a precipitation amount of the intermetallic compound is appropriately adjusted, so that coarsening of an intermetallic compound can be more sufficiently suppressed, and the hardness can be further improved. In the relation (3), the balance between a total content of a group of elements that improves the hardness of the solder alloy, and a total content of a group of elements that constitutes an intermetallic compound to be formed at a joint interface, is considered. By satisfying the relation (3), coarsening of an intermetallic compound is suppressed, and the heat cycle resistance and the EM resistance are further improved.

In the calculation of relations (1) to (3), the numerical values as shown in Tables 1 and 2, which are measured values of the alloy composition, have been used. In the calculation, in order to ensure that each and every value employed comprises the identical number of digits (based on the digits shown for the lower and upper limits in the respective relation), zeros have been added to the values shown in the tables, for those digits not shown. For example, in case that the Ag content is given as 1.0 mass % as the measured value, the Ag content used in the calculation of relations (1) to (3) was amended to comprise additional digits "0" depending on the required adaption. With respect to the relations (1) to (3), it follows, from the digits given in the upper and lower limits, that relation (1) is calculated with values comprising two decimal digits, relation (2) is calculated using three decimal digits, while relation (3) is calculated with only one decimal digit. This calculation rule is employed in the present application and is also intended to be employed for calculations in relation with further compositions described elsewhere, as all compositions have to be treated in the same manner. Concerning the amount of Sn in relation (2), unavoidable impurities are not considered, i.e. their respective amount is treated as 0 mass %. Accordingly, only essential and optional elements are considered.

From the viewpoint of further exerting the above-described effects, in terms of the lower limit, the relation (1) is preferably 13.00 or more, more preferably 13.20 or more, further preferably 14.78 or more, even more preferably 15.69 or more, particularly preferably 15.81 or more, and most preferably 17.17 or more. In terms of the upper limit, the relation (1) is preferably 23.27 or less, more preferably 23.12 or less, further preferably 22.99 or less, and particularly preferably 22.92 or less.

In terms of the lower limit, the relation (2) is preferably 0.017 or more, more preferably 0.021 or more, further preferably 0.023 or more, more further preferably 0.024 or more, and particularly preferably 0.025 or more. In terms of the upper limit, the relation (2) is preferably 0.039 or less, and most preferably 0.026 or less.

In terms of the lower limit, the relation (3) is preferably 70.9 or more, more preferably 75.5 or more, and further preferably 77.5 or more. In terms of the upper limit, the relation (3) is preferably 6349 or less, more preferably 1042.5 or less, more further preferably 500 or less, particularly preferably 180.4 or less, and most preferably 116.0 or less, and may be 113.2 or less.

(7) At Least One Selected from the Group Consisting of, at Least One of P, Ge, Ga, and as: 0.1% or Less in Total, at Least One of Fe and Co: 0.1% or Less in Total, Pd: 0.1% or Less, Zr: 0.1% or Less, Zn: 0.1% or Less, and Pb: 0.02% or Less.

An alloy composition of the solder alloy according to the present invention can contain at least one of P, Ge, Ga, As, Fe, Co, Pd, Zr, Zn, and Pb as an optional element. These will be described in detail below, and preferably, the alloy composition can contain at least one selected from the group consisting of, by mass %, at least one of, P: less than 0.01%, Ge: 0.01% or less, Ga: less than 0.01%, and As: more than 0.001% and 0.01% or less, Co: less than 0.01%, Pd: 0.01% or less, and Pb: less than 0.004%.

(7-1) At Least One of P, Ge, Ga, and as: 0.1% or Less in Total

These elements are optional elements that may be contained to a degree without inhibiting the above-described effects. In addition, these elements are optional elements that can suppress oxidation of Sn since these are oxidized in preference to Sn. According to the effects of surface reformation and oxidation suppression of the solder alloy, oxidation at the time of production of a solder alloy and formation of a solder joint and aging discoloration can be reduced, and the wettability can be improved. A total content of these elements is preferably 0.1% or less, and more preferably 0.003 to 0.03%. Although contents of the respective elements are not particularly limited, in order to sufficiently exert the above-described effects, the P content is preferably 0.0005 to 0.010%, and more preferably 0.001 to 0.008%, the Ge content is preferably 0.0005 to 0.01%, and more preferably 0.001 to 0.008%, and the Ga content is preferably 0.0005 to 0.01%, and more preferably 0.001 to 0.008%.

(7-2) At Least One of Fe and Co: 0.1% or Less in Total

These elements are optional elements that may be contained to a degree without inhibiting the above-described effects. These elements are optional elements that can be selected when making a more homogeneous alloy structure by modifying the dispersiveness of compounds in the solder alloy. Unless a total content of these elements is more than 0.1%, fluidity of the solder alloy on the solder surface is not inhibited. A total content of these elements is preferably 0.1% or less, and more preferably 0.002 to 0.02%. Although contents of the respective elements are not particularly limited, in order to sufficiently exert the above-described effects, an Fe content is preferably 0.001 to 0.01%, and more preferably 0.002 to 0.008%, and a Co content is preferably 0.002 to 0.01%, and more preferably 0.003 to 0.008%.

(7-3) Pd: 0.1% or Less

Pd is an optional element that may be contained to a degree without inhibiting the above-described effects. As with Ni, Pd is disposed as a substitution element for Cu in $Cu_6Sn_5$, and forms $(Cu, Ni, Pd)_6Sn_5$, and can further suppress compound growth at a joint interface. Pd also acts to suppress coarsening of the alloy structure in Sn—Bi-based solder alloy. The Pd content is preferably 0.1% or less, more preferably 0.0005 to 0.01%, and further preferably 0.001 to 0.01%.

(7-4) Zr: 0.1% or Less

This element is an optional element that may be contained to a degree without inhibiting the above-described effects. Zr has carbide reduction action, and can reduce carbonized flux residue remaining on a metal surface after mounting. As with Fe and Co, Zr can also contribute to modification of compound dispersiveness. The Zr content is preferably 0.1% or less, and more preferably 0.001 to 0.01%.

(7-5) Zn: 0.1% or Less

This element is an optional element that may be contained to a degree without inhibiting the above-described effects. In addition, Zn can suppress coarsening of the alloy structure in Sn—Bi-based solder alloy. Zn is also used to suppress growth of a compound generated at a joint interface, and can reduce Bi segregation. The Zn content is preferably 0.1% or less, and more preferably 0.001 to 0.01%.

(7-6) Pb: 0.02% or Less

This element is an optional element that may be contained to a degree without inhibiting the above-described effects. In addition, Pb reduces the missing rate and can be selected as a wetting behavior improving element. The Pb content is preferably 0.02% or less, more preferably 0.0005 to 0.003%, and further preferably 0.001 to 0.004%.

(8) Balance: Sn

The balance of the solder alloy according to the present invention is Sn. In addition to the above-described elements, unavoidable impurity may be contained. The balance of the solder alloy according to the present invention may consist of Sn and unavoidable impurities. Even when unavoidable impurity is contained, it does not affect the above-described effects. As described later, even when an element that is not contained in the present invention is contained as an inevitable impurity, it does not influence the above-described effects. The unavoidable impurities are not elements listed as essential elements (i.e., Bi, Ag, Cu, Ni, and Sb) nor as optional components (i.e., P, Ge, Ga, As, Fe, Co, Pd, Zr, Zn, and Pb).

(9) In, Ti, Ce

It is preferable that the solder alloy according to the present invention does not contain these elements. Although In contributes to a decrease in melting point of the solder alloy, In may deteriorate the heat cycle resistance, so that it is preferable that In is not contained in the solder alloy according to the present invention. Ti and Ce increase the melting point and hinder mounting at a low melting point, and promote surface oxidation of Sn—Bi solder alloy, so that it is preferable that Ti and Ce are not contained in the solder alloy according to the present invention.

(10) Homogenization of Precipitate

As a method for measuring the homogeneity of precipitate which has an influence on the properties of a solder alloy, a method prescribed below was used. A cross section of a solder joint was imaged at a magnification of 350 with an FE-SEM, intermetallic compound phases and Bi phases were identified with an EDS attached to the SEM, an area (S) of each phase was obtained, and crystal grain sizes of the intermetallic compound phases were obtained by a square root of $(4 S/\pi)$. An average crystal grain size and a maximum crystal grain size were measured by extracting intermetallic compound phases with crystal grain sizes of 1 μm or more and when Bi phases with crystal grain sizes of 5 μm or more were present, Bi phases of 5 μm or more. Bi phase is generally observed as a structure having a small grain size, in which the Bi phase and Sn phase are mixed in a patchy manner and the Bi phase has a curved grain boundary surface, and the Bi phase is usually not used for homogeneity judgment, however, when Bi crystal grains with crystal grain sizes of 5 μm or more were present, Bi crystal grains of 5 μm or more were extracted. Concerning crystal grains identified in this way, their average crystal grain size and maximum crystal grain size were measured by using image analysis software (Scandium manufactured by EMSIS GmbH).

In detail, the following calculations were performed. The numbers and total areas of intermetallic compound phases with crystal grain sizes of 1 μm or more and Bi phases with crystal grain sizes of 5 μm or more were obtained. An average area (S) was obtained by dividing a sum of the areas of the intermetallic compound phases and the Bi phases of 5 μm or more by a sum of the numbers of intermetallic compound phases and Bi phases of 5 μm or more. The square root of $(4 S/\pi)$ was obtained as the average crystal grain size by the obtained average area (S). Concerning the maximum crystal grain size, the largest intermetallic compound phase or Bi phase was visually selected from an image taken at a magnification of 350 with an FE-SEM, and the square root of $(4 S/\pi)$ was obtained as the maximum crystal grain size by its area (S). The average crystal grain size is preferably 3 µm to 15 µm. The maximum crystal grain size is preferably more than 3 µm and 30 µm or less, and more preferably 5 to 20 µm. Within these ranges, the crystal grain size is neither excessively small nor excessively large, and this contributes to further homogenization of the structure, and can bring about a precipitation effect that realizes both of the hardness in a high-temperature environment and the heat cycle resistance, and suppress deterioration of EM properties caused by excessive refinement of the metallic structure of the Sn—Bi solder.

2. Solder Ball

The solder alloy according to the present invention can be used as a solder ball. The solder ball according to the present invention is used to form bumps of electrodes and a substrate of a semiconductor package such as a BGA (Ball Grid Array). A diameter of the solder ball according to the present invention is preferably within a range of 1 to 1000 µm. The solder ball can be produced by a general solder ball producing method.

3. Solder Paste

The solder alloy according to the present invention can be used as solder paste. The solder paste is obtained by mixing solder alloy powder with a small amount of flux and processing these in paste form. The solder alloy according to the present invention may be used as solder paste for mounting an electronic component to a printed circuit board by a reflow soldering method. The flux to be used for the solder paste may be either a water-soluble flux or a water-insoluble flux. Typically, a rosin-based flux as a rosin-based water-insoluble flux is used.

4. Solder Joint

The solder joint according to the present invention connects an IC chip and a substrate (interposer) of the IC chip in a semiconductor package, or joins and connects a semiconductor package and a printed circuit board. That is, the solder joint according to the present invention is a connecting portion of an electrode, and can be formed by using general soldering conditions.

5. Method for Producing the Solder Alloy

The method for producing the solder alloy according to the present invention may be performed in the usual manner.

When producing the solder alloy according to the present invention, as in a conventional case, when a BiSb alloy is produced in advance and then Sn is added, formation of a compound of Sb and Sn may be inhibited. When a solid solution of Bi and Sb is maintained, homogeneous alloy structure formation may be inhibited. Therefore, the process of producing the solder alloy according to the present invention is not particularly limited unless Sn is added after production of a BiSb alloy as described above. As a production example, it is preferable that alloys of Sn and the respective additive elements are produced, and the alloys are weighed so that their amounts are as predetermined, and molten under the conditions described above. For example, Ag, Cu, and Bi are respectively added to molten Sn, and Sb and Ni may be added as SnSb alloy or SnNi alloy. That is, in consideration of the properties of the respective constituent elements, the respective constituent elements are preferably added in the form of a single element or an alloy to Sn.

By using a low-alpha-ray material as a raw material of the solder alloy according to the present invention, a low-alpha-ray alloy can be produced as the solder alloy. When such a low-alpha-ray alloy is used for forming solder bumps around a memory, soft errors can be suppressed.

The joining method using the solder alloy according to the present invention may be performed in the usual manner by using, for example, a reflow method. A melting temperature of the solder alloy when flow soldering is performed may be a temperature approximately 20° C. higher than the liquidus-line temperature. In the case of joining by using the solder alloy according to the present invention, the alloy structure can be made appropriate finer by considering a cooling rate for solidification. For example, a solder joint is cooled at a cooling rate of 2 to 3° C./s or more. The other joining conditions can be adjusted as appropriate according to the alloy composition of the solder alloy.

EXAMPLES

Solder alloys having alloy compositions described in Table 1 and Table 2 were prepared, their alloy structures were observed, homogeneities of the alloy structures were evaluated, melting points (liquidus-line temperatures) and solidus-line temperatures were measured, 99.9% melting judgment was performed at 200° C. or less, surface hardness measurements of bumps were also made, and further, a heat cycle test was conducted as a test for the TCT resistance, secondary creep rates were measured, and in addition, EM resistances were evaluated.

Observation of Alloy Structures and Evaluation of Homogeneities of Alloy Structures Solder balls having alloy compositions described in Table 1 and Table 2 were produced. Solder balls with a diameter of 0.24 mm were placed on electrodes of a substrate on which a soldering flux (product name: WF-6317 made by Senju Metal Industry Co., Ltd.) made of a solvent, an activator, a thixotropic agent, and an organic acid, etc., was applied, one BGA component was mounted by a mounter, reflow soldering was performed under conditions of a maximum temperature of 190° C. and a holding time of 90 seconds, and accordingly, a test substrate was fabricated. A component joined portion was molded from resin and ground, and a portion where the solder alloy was ground by about half was imaged at a magnification of 350 with an FE-SEM. Then, the cross-sectional portion was subjected to qualitative analysis by EDS attached to the SEM and intermetallic compound phases were identified, and an average crystal grain size and a maximum crystal grain size were measured by using image analysis software (Scandium made by EMSIS GmbH).

Concerning the average crystal grain size, first, intermetallic compound phases and Bi phases were identified from the obtained image by EDS, areas (S) of these were obtained, and crystal grain sizes of the intermetallic compound phases and the Bi phases were obtained by a square root of $(4\,S/\pi)$. In these measurements, intermetallic compound phases with crystal grain sizes of 1 µm or more and Bi phases with crystal grain sizes of 5 µm or more were extracted. The numbers and total areas of extracted intermetallic compound phases and Bi phases were obtained, and an average area (S) was obtained by dividing a sum of the areas of the intermetallic compound phases and the Bi phases by a sum of the numbers of intermetallic compound phases and Bi phases. A square root of $(4\,S/\pi)$ was obtained as an average crystal grain size by the obtained average area (S). Concerning the maximum crystal grain size, the largest intermetallic compound phase was visually selected from an image imaged at a magnification of 350 by an FE-SEM, and from its area (S), the maximum crystal grain size was obtained as a square root of $(4\,S/\pi)$.

A case where the average crystal grain size was 3 to 15 µm was evaluated as "o," and a case where the average crystal grain size was less than 3 µm and a case where the average crystal grain size was more than 15 μm were evaluated as "x." Concerning the maximum crystal grain size, a case where the maximum crystal grain size was more than 20 μm and 30 μm or less was evaluated as "o," and a case where the maximum crystal grain size was 5 to 20 μm was evaluated as "oo." A case where the maximum crystal grain size was more than 30 μm, and a case where the maximum crystal grain size was less than 3 μm, were evaluated as "x." In these evaluations, "o" is an evaluation that no problem occurs in practical use, "oo" is an evaluation as practically satisfactory, and "x" is an evaluation that a problem may occur in practical use.

Melting Point (Liquidus-Line Temperature), Solidus-Line Temperature, and 99.9% Melting Judgment at 200° C. or Less The respective solder alloys described in Table 1 and Table 2 were prepared, and liquidus-line temperatures and solidus-line temperatures of the solder alloys were measured. The solidus-line temperature measurement was made according to JIS Z3198-1: 2014. The liquidus-line temperature measurement was made according to a method using DSC similar to the solidus-line temperature measuring method of JIS Z3198-1: 2014, instead of the liquidus-line temperature measurement of JIS Z3198-1: 2014.

Then, as indicated in FIG. 1, based on the melting curve obtained by DSC, a melting rate was judged based on an area ratio that was a value obtained by dividing a whole area drawn by a curved portion indicating melting reaction of the solder alloy, that is, reaction calories necessary for complete melting (the area between the liquidus line and the solidus line) by reaction calories (the area of the shaded portion) completed before reaching 200° C., and multiplying the result of dividing by 100. A case where 99.9% was judged to have melted before reaching 200° C. was evaluated as "o," and a case where melting did not reach 99.9% was evaluated as "x." "o" is an evaluation as having no problem in practical use, and "x" is an evaluation that a problem may occur in practical use.

Measurement of Surface Hardness of Bumps

In a surface hardness measurement, the model number HM-100 made by Mitutoyo Corporation was used, and a load of 1.96N was applied for 60 seconds at 110° C., and 5 arbitrary bumps were measured, and an average of the measurement results was used as Vickers hardness. A case where the Vickers hardness was more than 9.0 Hv was judged as "oo," a case where the Vickers hardness was 7.0 to 9.0 Hv was judged as "o," and a case where the Vickers hardness was less than 7.0 Hv was judged as "x." "o" is an evaluation that no problem occurs in practical use, "oo" is an evaluation as practically satisfactory, and "x" is an evaluation that a problem may occur in practical use.

Heat Cycle Test (Reliability)

Solder balls including the solder alloys described in Table 1 and Table 2 were produced. Solder balls with a diameter of 0.24 mm were placed on electrodes of a substrate on which a soldering flux (product name: WF-6317 made by Senju Metal Industry Co., Ltd.) made of a solvent, an activator, a thixotropic agent, and an organic acid, etc., was applied, 15 BGA components were mounted by a mounter, reflow soldering was performed under conditions of a maximum temperature of 190° C. and a holding time of 90 seconds, and accordingly, a test substrate was fabricated.

Test substrates on which soldering of the respective solder alloys were performed were put into a heat cycle tester set to the conditions of a low temperature of −40° C., a high temperature of +100° C., and a holding time of 10 minutes, and solder joints of the test substrates in the tester were observed. The numbers of cycles in which solder joints joining 15 BGA components and the test substrates ruptured were measured, and the average number of rupture cycles was obtained. Rupture judgment was made according to resistance value records using a daisy chain circuit, and the judgment was made at a timing a resistance value of over 200% was reached from the start of the test. The reliability was judged as "oo" when the number of cycles was more than 3500, the reliability was judged as "o" when the number of cycles was 3000 to 3500, and the reliability was judged as "x" when the number of cycles was less than 3000. "o" is an evaluation that no problem occurs in practical use, "oo" is an evaluation as practically satisfactory, and "x" is an evaluation that a problem may occur in practical use.

Measurement of Secondary Creep Rate (Creep Properties)

Figure 2:
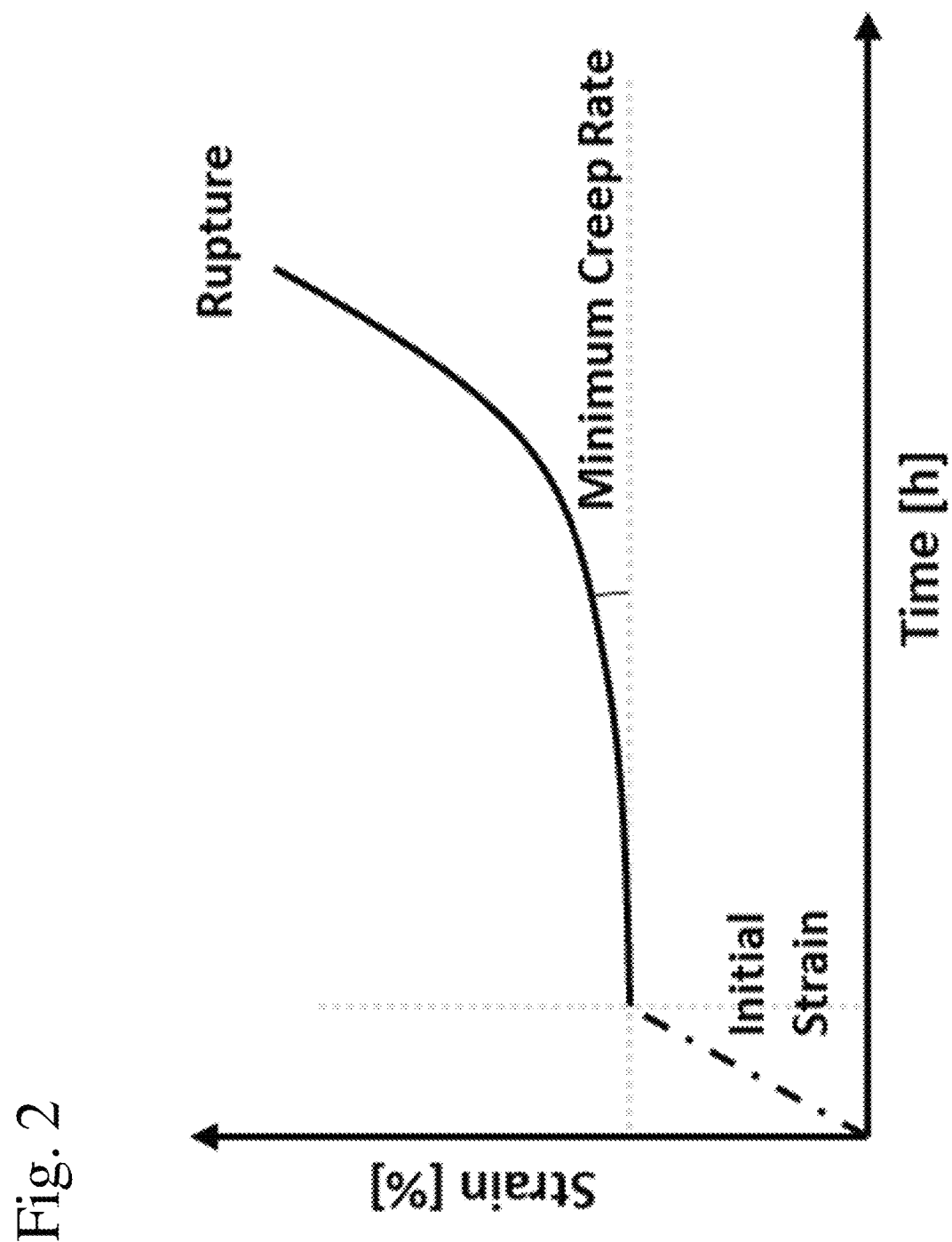
FIG. 2 is a schematic diagram of a creep curve.

The tension test (measuring apparatus: CCS-0002M (manufactured by GSE Co., Ltd)) was used, and a fabricated test piece was put in a constant-temperature bath at 110° C., a creep test was conducted by applying a load of 6.25 MPa, a minimum creep rate was calculated from an obtained creep curve. A schematic diagram of the creep curve is indicated in FIG. 2. As dimensions of the test piece including the solder alloy described in Table 1, a distance between gauge points was 50 mm, and a diameter of a parallel portion was 10 mm.

For evaluation, a secondary creep rates per Bi content ((creep rate)/(Bi content (mass %))) was calculated. In the alloy composition with a Bi content of 42.0% or less, a case where the value of ((creep rate)/(Bi content (mass %))) was more than 0.23 and 0.25 or less was judged as "Δ," and a case where the value was 0.23 or less was judged as "o." In the alloy composition with a Bi content of more than 42.0% and 50% or less, a case where the value of ((creep rate)/(Bi content (mass %))) was more than 0.13 and 0.15 or less was judged as "Δ," and a case where the value is 0.13 or less was judged as "o." In an alloy composition with a Bi content of more than 50% and 62% or less, a case where the value of ((creep rate)/(Bi content (mass %))) was more than 0.03 and 0.05 or less was judged as "Δ," and a case where the value is 0.03 or less was judged as "o." "Δ" is an evaluation that no problem occurs in practical use, and "o" is an evaluation as practically satisfactory, and when these evaluations were given, the hardness and/or reliability was judged to be at a level having no problem in practical use. A case where the value of ((creep rate)/(Bi content (mass %))) was outside the above-described ranges, that is, the creep rate according to the Bi content was high, was judged as "x." "x" is an evaluation that a problem may occur in practical use, and when this evaluation was given, the hardness or reliability was judged to induce a problem in practical use.

EM Resistance

As the EM test sample, a package was fabricated by using solder balls with a diameter of 0.24 mm made of a solder alloy described in Table 1 and performing reflow soldering on a package substrate with a size of 12 mm×12 mm including Cu electrodes with a diameter of 0.24 mm by using a water-soluble flux. Then, by printing solder paste on a glass epoxy substrate (FR-4) with a size of 29 mm×19 mm and a thickness of 0.8 mm, and mounting the package fabricated as described above, a reflow soldering test substrate was fabricated under conditions of a maximum temperature of 190° C. and a holding time of 90 seconds.

The fabricated test substrate was connected to a compact variable switching power supply (PAK-A made by KIKUSUI ELECTRONICS CORP.), and a current was applied in a silicon oil bath held at 110° C. During current application, an electric resistance of the sample was continuously measured, and a time required until the resistance increased by 150% compared with the initial resistance value was measured. A case where the time was more than 350 hours was evaluated as "oo," a case where the time was 300 to 350 hours was evaluated as "o," and a case where the time was less than 300 hours is evaluated as "x." "o" is an evaluation that no problem occurs in practical use, "oo" is an evaluation as practically satisfactory, and "x" is an evaluation that a problem may occur in practical use.

Compositions examined in the examples are described in Table 1 and Table 2, and evaluation results of the respective examined compositions are described in Table 3 and Table 4.

TABLE 1

| | Alloy Composition [mass %] | | | | | | | | | | | | | | | | | | Relation (1) | Relation (2) | Relation (3) |
|---|---|---|---|---|---|---|---|---|---|---|---|---|---|---|---|---|---|---|---|---|---|
| | Sn | Bi | Ag | Cu | Ni | Sb | Ge | P | Ga | As | Fe | Co | Pd | Zn | Zr | Pb | In | Ti | Ce | | | |
| Ex 1 | Bal. | 30 | 1.0 | 0.50 | 0.030 | 0.50 | | | | | | | | | | | | | | 14.78 | 0.023 | 59.4 |
| Ex2 | Bal. | 35 | 1.0 | 0.50 | 0.030 | 0.50 | | | | | | | | | | | | | | 17.24 | 0.024 | 68.9 |
| Ex3 | Bal. | 36 | 1.0 | 0.50 | 0.030 | 0.50 | | | | | | | | | | | | | | 17.73 | 0.025 | 70.8 |
| Ex4 | Bal. | 40 | 1.0 | 0.50 | 0.030 | 0.50 | | | | | | | | | | | | | | 19.70 | 0.026 | 78.3 |
| Ex5 | Bal. | 45 | 1.0 | 0.50 | 0.030 | 0.40 | | | | | | | | | | | | | | 23.32 | 0.029 | 87.5 |
| Ex6 | Bal. | 50 | 1.0 | 0.50 | 0.030 | 0.50 | | | | | | | | | | | | | | 24.63 | 0.032 | 97.2 |
| Ex7 | Bal. | 58 | 1.0 | 0.50 | 0.030 | 0.50 | | | | | | | | | | | | | | 28.57 | 0.038 | 112.3 |
| Ex8 | Bal. | 60 | 1.0 | 0.50 | 0.030 | 0.50 | | | | | | | | | | | | | | 29.56 | 0.040 | 116.0 |
| Ex9 | Bal. | 40 | 0.7 | 0.50 | 0.030 | 0.50 | | | | | | | | | | | | | | 23.12 | 0.021 | 77.7 |
| Ex10 | Bal. | 40 | 1.3 | 0.50 | 0.030 | 0.50 | | | | | | | | | | | | | | 17.17 | 0.032 | 78.9 |
| Ex11 | Bal. | 40 | 2.0 | 0.50 | 0.030 | 0.50 | | | | | | | | | | | | | | 13.20 | 0.044 | 80.2 |
| Ex12 | Bal. | 40 | 1.2 | 0.01 | 0.030 | 0.50 | | | | | | | | | | | | | | 22.99 | 0.021 | 1042.5 |
| Ex13 | Bal. | 40 | 1.0 | 0.20 | 0.030 | 0.50 | | | | | | | | | | | | | | 23.12 | 0.021 | 180.4 |
| Ex14 | Bal. | 40 | 1.0 | 0.70 | 0.030 | 0.50 | | | | | | | | | | | | | | 17.94 | 0.030 | 56.8 |
| Ex15 | Bal. | 40 | 1.0 | 1.00 | 0.030 | 0.50 | | | | | | | | | | | | | | 15.81 | 0.035 | 40.3 |
| Ex16 | Bal. | 40 | 1.0 | 0.50 | 0.010 | 0.50 | | | | | | | | | | | | | | 19.90 | 0.026 | 81.4 |
| Ex17 | Bal. | 40 | 1.0 | 0.50 | 0.050 | 0.50 | | | | | | | | | | | | | | 19.51 | 0.027 | 75.5 |
| Ex18 | Bal. | 40 | 1.0 | 0.50 | 0.100 | 0.50 | | | | | | | | | | | | | | 19.05 | 0.028 | 69.2 |
| Ex19 | Bal. | 40 | 1.0 | 0.05 | 1.000 | 0.50 | | | | | | | | | | | | | | 15.69 | 0.036 | 39.5 |
| Ex20 | Bal. | 41 | 1.0 | 0.50 | 0.030 | 0.20 | | | | | | | | | | | | | | 23.70 | 0.027 | 79.6 |
| Ex21 | Bal. | 40 | 1.0 | 0.50 | 0.030 | 0.40 | | | | | | | | | | | | | | 20.73 | 0.026 | 78.1 |
| Ex22 | Bal. | 40 | 1.0 | 0.50 | 0.030 | 0.70 | | | | | | | | | | | | | | 17.94 | 0.026 | 78.7 |
| Ex23 | Bal. | 40 | 1.0 | 0.50 | 0.030 | 1.00 | | | | | | | | | | | | | | 15.81 | 0.027 | 79.2 |
| Ex24 | Bal. | 40 | 1.0 | 0.50 | 0.030 | 1.50 | | | | | | | | | | | | | | 13.20 | 0.027 | 80.2 |
| Ex25 | Bal. | 45 | 1.0 | 0.50 | 0.100 | 0.50 | | | | | | | | | | | | | | 21.43 | 0.030 | 77.5 |
| Ex26 | Bal. | 45 | 1.0 | 0.50 | 0.030 | 1.00 | | | | | | | | | | | | | | 17.79 | 0.029 | 88.7 |
| Ex27 | Bal. | 50 | 1.0 | 0.50 | 0.030 | 1.00 | | | | | | | | | | | | | | 19.76 | 0.032 | 98.1 |
| Ex28 | Bal. | 58 | 1.0 | 0.50 | 0.030 | 1.00 | | | | | | | | | | | | | | 22.92 | 0.039 | 113.2 |
| Ex29 | Bal. | 58 | 1.0 | 0.50 | 0.030 | 1.50 | | | | | | | | | | | | | | 19.14 | 0.039 | 114.2 |
| Ex30 | Bal. | 40 | 1.0 | 0.50 | 0.030 | 0.50 | 0.001 | | | | | | | | | | | | | 19.70 | 0.026 | 78.3 |
| Ex31 | Bal. | 40 | 1.0 | 0.50 | 0.030 | 0.50 | 0.01 | | | | | | | | | | | | | 19.70 | 0.026 | 78.3 |
| Ex32 | Bal. | 40 | 1.0 | 0.50 | 0.030 | 0.50 | | 0.001 | | | | | | | | | | | | 19.70 | 0.026 | 78.3 |
| Ex33 | Bal. | 40 | 1.0 | 0.50 | 0.030 | 0.50 | | 0.01 | | | | | | | | | | | | 19.70 | 0.026 | 78.3 |
| Ex34 | Bal. | 40 | 1.0 | 0.50 | 0.030 | 0.50 | | | 0.001 | | | | | | | | | | | 19.70 | 0.026 | 78.3 |
| Ex35 | Bal. | 40 | 1.0 | 0.50 | 0.030 | 0.50 | | | 0.01 | | | | | | | | | | | 19.70 | 0.026 | 78.3 |
| Ex36 | Bal. | 40 | 1.0 | 0.50 | 0.030 | 0.50 | | | | 0.001 | z | z | z | z | z | z | z | z | z | 19.70 | 0.026 | 78.3 |

Ex = Example; and Bal. = Balance

TABLE 2

| | Alloy Composition [mass %] | | | | | | | | | | |
|---|---|---|---|---|---|---|---|---|---|---|---|
| | Sn | Bi | Ag | Cu | Ni | Sb | Ge | P | Ga | As | Fe |
| Ex37 | Bal. | 40 | 1.0 | 0.50 | 0.030 | 0.50 | | | | 0.01 | |
| Ex38 | Bal. | 40 | 1.0 | 0.50 | 0.030 | 0.50 | | | | | 0.001 |
| Ex39 | Bal. | 40 | 1.0 | 0.50 | 0.030 | 0.50 | | | | | 0.01 |
| Ex40 | Bal. | 40 | 1.0 | 0.50 | 0.030 | 0.50 | | | | | |
| Ex41 | Bal. | 40 | 1.0 | 0.50 | 0.030 | 0.50 | | | | | |
| Ex42 | Bal. | 40 | 1.0 | 0.50 | 0.030 | 0.50 | | | | | |
| Ex43 | Bal. | 40 | 1.0 | 0.50 | 0.030 | 0.50 | | | | | |
| Ex44 | Bal. | 40 | 1.0 | 0.50 | 0.030 | 0.50 | | | | | |
| Ex45 | Bal. | 40 | 1.0 | 0.50 | 0.030 | 0.50 | | | | | |
| Ex46 | Bal. | 40 | 1.0 | 0.50 | 0.030 | 0.50 | | | | | |
| Ex47 | Bal. | 40 | 1.0 | 0.50 | 0.030 | 0.50 | | | | | |
| Ex48 | Bal. | 40 | 1.0 | 0.50 | 0.030 | 0.50 | | | | | |
| Ex49 | Bal. | 40 | 1.0 | 0.50 | 0.030 | 0.50 | | | | | |
| Ex50 | Bal. | 40 | 1.0 | 0.50 | 0.030 | 0.50 | 0.001 | 0.001 | 0.001 | 0.001 | 0.001 |
| Comp. Ex1 | Bal. | 40 | 0 | 0.00 | 0.000 | 0.00 | | | | | |
| Comp. Ex2 | Bal. | 29 | 1.0 | 0.50 | 0.030 | 0.50 | | | | | |
| Comp. Ex3 | Bal. | 61 | 1.0 | 0.50 | 0.030 | 0.50 | | | | | |

TABLE 2-continued

| | | | | | | |
|---|---|---|---|---|---|---|
| Comp. Ex4 | Bal. | 40 | <u>0</u> | 0.50 | 0.030 | <u>0</u> |
| Comp. Ex5 | Bal. | 30 | <u>0</u> | 0.50 | 0.030 | <u>0</u> |
| Comp. Ex6 | Bal. | 58 | <u>0</u> | 0 | 0.015 | <u>0</u> |
| Comp. Ex7 | Bal. | 40 | <u>0</u> | 0 | 0.030 | 0.50 |
| Comp. Ex8 | Bal. | 45 | <u>0.5</u> | 0.10 | 0.500 | 1.50 |
| Comp. Ex9 | Bal. | 40 | <u>2.1</u> | 0.50 | 0.030 | 0.50 |
| Comp. Ex10 | Bal. | 40 | 1.0 | <u>0.00</u> | 0.030 | 0.50 |
| Comp. Ex11 | Bal. | 40 | 1.0 | <u>1.10</u> | 0.030 | 0.50 |
| Comp. Ex12 | Bal. | 42 | 1.0 | 0.40 | <u>0.004</u> | 0.40 |
| Comp. Ex13 | Bal. | 40 | 1.0 | 0.50 | <u>1.100</u> | 0.50 |
| Comp. Ex14 | Bal. | 56.9 | 1.0 | 0.10 | 0.020 | <u>0.10</u> |
| Comp. Ex15 | Bal. | 40 | 1.0 | 0.50 | 0.030 | <u>1.60</u> |
| Comp. Ex16 | Bal. | 42.3 | 0.8 | 0.50 | <u>1.200</u> | <u>2.00</u> |
| Comp. Ex17 | Bal. | 40 | 1.0 | 0.50 | 0.030 | 0.50 |
| Comp. Ex18 | Bal. | 57.6 | <u>0.4</u> | 0.50 | 0.020 | 1.00 |

| | Alloy Composition [mass %] | | | | | | | | Relation (1) | Relation (2) | Relation (3) |
|---|---|---|---|---|---|---|---|---|---|---|---|
| | Co | Pd | Zn | Zr | Pb | In | Ti | Ce | | | |
| Ex37 | | | | | | | | | 19.70 | 0.026 | 78.3 |
| Ex38 | | | | | | | | | 19.70 | 0.026 | 78.3 |
| Ex39 | | | | | | | | | 19.70 | 0.026 | 78.3 |
| Ex40 | 0.001 | | | | | | | | 19.70 | 0.026 | 78.3 |
| Ex41 | 0.01 | | | | | | | | 19.70 | 0.026 | 78.3 |
| Ex42 | | 0.001 | | | | | | | 19.70 | 0.026 | 78.3 |
| Ex43 | | 0.01 | | | | | | | 19.70 | 0.026 | 78.3 |
| Ex44 | | | 0.001 | | | | | | 19.70 | 0.026 | 78.3 |
| Ex45 | | | 0.01 | | | | | | 19.70 | 0.026 | 78.3 |
| Ex46 | | | | 0.001 | | | | | 19.70 | 0.026 | 78.3 |
| Ex47 | | | | 0.01 | | | | | 19.70 | 0.026 | 78.3 |
| Ex48 | | | | | 0.001 | | | | 19.70 | 0.026 | 78.3 |
| Ex49 | | | | | 0.004 | | | | 19.70 | 0.026 | 78.3 |
| Ex50 | 0.001 | 0.001 | 0.001 | 0.001 | 0.001 | | | | 19.70 | 0.026 | 78.3 |
| Comp. Ex1 | | | | | | | | | — | 0.000 | — |
| Comp. Ex2 | | | | | | | | | 14.29 | 0.022 | 57.5 |
| Comp. Ex3 | | | | | | | | | 30.05 | 0.041 | 117.9 |
| Comp. Ex4 | | | | | | | | | 75.47 | 0.009 | 75.5 |
| Comp. Ex5 | | | | | | | | | 56.60 | 0.008 | 56.6 |
| Comp. Ex6 | | | | | | | | | 3866.67 | 0.000 | 3866.7 |
| Comp. Ex7 | | | | | | | | | 75.47 | 0.001 | 1350.0 |
| Comp. Ex8 | | | | | | | <u>1.5</u> | <u>1</u> | 17.31 | 0.022 | 78.3 |
| Comp. Ex9 | | | | | | | | | 12.78 | 0.046 | 80.4 |
| Comp. Ex10 | | | | | | | | | 26.14 | 0.018 | 1383.3 |
| Comp. Ex11 | | | | | | | | | 15.21 | 0.037 | 36.7 |
| Comp. Ex12 | | | | | | | | | 23.28 | 0.025 | 107.4 |
| Comp. Ex13 | | | | | | | | | 12.90 | 0.046 | 25.9 |
| Comp. Ex14 | | | | | | | | | 46.64 | 0.027 | 483.3 |
| Comp. Ex15 | | | | | | | | | 12.78 | 0.027 | 80.4 |

TABLE 2-continued

| | | | | | | | |
|---|---|---|---|---|---|---|---|
| Comp. Ex16 | | | | 0.5 | 1.5 | 1.5 | 9.40 | 0.050 | 26.5 |
| Comp. Ex17 | | | | 0.1 | — | — | 19.70 | 0.026 | 78.3 |
| Comp. Ex18 | | | | 0.1 | — | — | 30.00 | 0.023 | 113.5 |

Ex = Example; Comp. Ex. = Comparative Example; and Bal. = Balance
The underline indicates that it does not fall within the scope of the present invention.

TABLE 3

| | melting point, structure state | | | | | bump hardness under high temperature environment | |
|---|---|---|---|---|---|---|---|
| | | | 99.9% | precipitate | | | |
| | Solidus Line [deg C.] | Liquidus Line [deg C.] | melting judgment at 200° C. or less | average crystal grain size judgment | precipitate crystal grain size judgment | surface hardness of bumps [Hv] | hardness judgment |
| Ex1 | 140 | 199 | ○ | ○ | ○ | 13.7 | ○○ |
| Ex2 | 142 | 186 | ○ | ○ | ○ | 12.4 | ○○ |
| Ex3 | 138 | 185 | ○ | ○ | ○ | 12.1 | ○○ |
| Ex4 | 139 | 181 | ○ | ○ | ○○ | 11.1 | ○○ |
| Ex5 | 140 | 169 | ○ | ○ | ○○ | 9.3 | ○○ |
| Ex6 | 139 | 166 | ○ | ○ | ○○ | 8.1 | ○ |
| Ex7 | 140 | 149 | ○ | ○ | ○○ | 7.7 | ○ |
| Ex8 | 141 | 152 | ○ | ○ | ○ | 7.2 | ○ |
| Ex9 | 140 | 183 | ○ | ○ | ○○ | 11.1 | ○○ |
| Ex10 | 138 | 181 | ○ | ○ | ○○ | 10.2 | ○○ |
| Ex11 | 138 | 182 | ○ | ○ | ○ | 10.9 | ○○ |
| Ex12 | 138 | 182 | ○ | ○ | ○○ | 11.1 | ○○ |
| Ex13 | 139 | 181 | ○ | ○ | ○○ | 10.1 | ○○ |
| Ex14 | 139 | 184 | ○ | ○ | ○○ | 9.2 | ○○ |
| Ex15 | 141 | 191 | ○ | ○ | ○ | 9.2 | ○○ |
| Ex16 | 139 | 183 | ○ | ○ | ○○ | 10.8 | ○○ |
| Ex17 | 140 | 186 | ○ | ○ | ○○ | 10.0 | ○○ |
| Ex18 | 141 | 185 | ○ | ○ | ○○ | 9.2 | ○○ |
| Ex19 | 143 | 439 | ○ | ○ | ○ | 9.7 | ○○ |
| Ex20 | 140 | 179 | ○ | ○ | ○○ | 9.3 | ○○ |
| Ex21 | 140 | 181 | ○ | ○ | ○○ | 10.5 | ○○ |
| Ex22 | 140 | 182 | ○ | ○ | ○○ | 10.2 | ○○ |
| Ex23 | 141 | 177 | ○ | ○ | ○○ | 9.1 | ○○ |
| Ex24 | 142 | 180 | ○ | ○ | ○○ | 10.0 | ○○ |
| Ex25 | 141 | 161 | ○ | ○ | ○○ | 9.6 | ○○ |
| Ex26 | 140 | 162 | ○ | ○ | ○○ | 9.2 | ○○ |
| Ex27 | 141 | 162 | ○ | ○ | ○○ | 9.2 | ○○ |
| Ex28 | 141 | 153 | ○ | ○ | ○○ | 9.2 | ○○ |
| Ex29 | 142 | 147 | ○ | ○ | ○○ | 9.4 | ○○ |
| Ex30 | 139 | 179 | ○ | ○ | ○○ | 10.7 | ○○ |
| Ex31 | 140 | 180 | ○ | ○ | ○○ | 10.3 | ○○ |
| Ex32 | 140 | 180 | ○ | ○ | ○○ | 10.8 | ○○ |
| Ex33 | 139 | 182 | ○ | ○ | ○○ | 10.0 | ○○ |
| Ex34 | 138 | 181 | ○ | ○ | ○○ | 11.0 | ○○ |
| Ex35 | 138 | 180 | ○ | ○ | ○○ | 11.2 | ○○ |
| Ex36 | 140 | 180 | ○ | ○ | ○○ | 10.2 | ○○ |
| Ex37 | 139 | 181 | ○ | ○ | ○○ | 9.6 | ○○ |
| Ex38 | 140 | 180 | ○ | ○ | ○○ | 9.2 | ○○ |
| Ex39 | 140 | 181 | ○ | ○ | ○○ | 10.1 | ○○ |
| Ex40 | 139 | 181 | ○ | ○ | ○○ | 11.1 | ○○ |
| Ex41 | 140 | 182 | ○ | ○ | ○○ | 11.3 | ○○ |
| Ex42 | 139 | 183 | ○ | ○ | ○○ | 10.6 | ○○ |

| | TCT resistance | | | creep properties with respect to Bi content judgment | EM resistance | |
|---|---|---|---|---|---|---|
| | Average rupture cycles [cyc] | reliability judgment | secondary Creep Rate [%/h] | (secondary creep rates)/ (Bi content (mass %)) [%/h] | | EM resistance [h] | EM resistance judgment |
| Ex1 | 3010 | ○ | 6.77 | 0.23 | ○ | 303 | ○ |
| Ex2 | 3109 | ○ | 7.09 | 0.20 | ○ | 323 | ○ |
| Ex3 | 3251 | ○ | 7.19 | 0.20 | ○ | 331 | ○ |
| Ex4 | 4169 | ○○ | 9.01 | 0.23 | ○ | 385 | ○○ |

TABLE 3-continued

|  |  |  |  |  |  |  |  |
|---|---|---|---|---|---|---|---|
| Ex5 | 3411 | ○ | 5.81 | 0.13 | ○ | 398 | ○○ |
| Ex6 | 3621 | ○○ | 4.22 | 0.08 | ○ | 411 | ○○ |
| Ex7 | 4976 | ○○ | 1.28 | 0.02 | ○ | 434 | ○○ |
| Ex8 | 4202 | ○○ | 3.00 | 0.05 | Δ | 342 | ○ |
| Ex9 | 4040 | ○○ | 8.96 | 0.22 | ○ | 358 | ○○ |
| Ex10 | 4234 | ○○ | 8.75 | 0.22 | ○ | 403 | ○○ |
| Ex11 | 3721 | ○○ | 6.25 | 0.16 | ○ | 419 | ○○ |
| Ex12 | 3997 | ○○ | 8.94 | 0.22 | ○ | 395 | ○○ |
| Ex13 | 3528 | ○○ | 8.92 | 0.22 | ○ | 371 | ○○ |
| Ex14 | 3342 | ○ | 8.84 | 0.22 | ○ | 384 | ○○ |
| Ex15 | 4011 | ○○ | 8.29 | 0.21 | ○ | 396 | ○○ |
| Ex16 | 4030 | ○○ | 7.51 | 0.19 | ○ | 356 | ○○ |
| Ex17 | 4031 | ○○ | 8.72 | 0.22 | ○ | 387 | ○○ |
| Ex18 | 3363 | ○ | 7.20 | 0.18 | ○ | 377 | ○○ |
| Ex19 | 3421 | ○ | 8.10 | 0.20 | ○ | 329 | ○ |
| Ex20 | 3521 | ○○ | 9.00 | 0.22 | ○ | 344 | ○ |
| Ex21 | 4112 | ○○ | 8.44 | 0.21 | ○ | 362 | ○○ |
| Ex22 | 3855 | ○○ | 7.28 | 0.18 | ○ | 426 | ○○ |
| Ex23 | 3612 | ○○ | 5.50 | 0.14 | ○ | 388 | ○○ |
| Ex24 | 3720 | ○○ | 5.10 | 0.13 | ○ | 375 | ○○ |
| Ex25 | 3598 | ○○ | 5.79 | 0.13 | ○ | 392 | ○○ |
| Ex26 | 3991 | ○○ | 5.95 | 0.13 | ○ | 369 | ○○ |
| Ex27 | 3696 | ○○ | 5.10 | 0.10 | ○ | 387 | ○○ |
| Ex28 | 4723 | ○○ | 1.51 | 0.03 | ○ | 427 | ○○ |
| Ex29 | 4670 | ○○ | 1.52 | 0.03 | ○ | 401 | ○○ |
| Ex30 | 3849 | ○○ | 8.91 | 0.22 | ○ | 384 | ○○ |
| Ex31 | 3742 | ○○ | 9.10 | 0.23 | ○ | 402 | ○○ |
| Ex32 | 3394 | ○ | 8.11 | 0.20 | ○ | 355 | ○○ |
| Ex33 | 3529 | ○○ | 8.13 | 0.20 | ○ | 388 | ○○ |
| Ex34 | 3511 | ○○ | 9.20 | 0.23 | ○ | 356 | ○○ |
| Ex35 | 3208 | ○ | 10.10 | 0.25 | Δ | 371 | ○○ |
| Ex36 | 3937 | ○○ | 8.93 | 0.22 | ○ | 344 | ○ |
| Ex37 | 4021 | ○○ | 8.92 | 0.22 | ○ | 355 | ○○ |
| Ex38 | 3581 | ○○ | 9.73 | 0.24 | Δ | 329 | ○ |
| Ex39 | 3777 | ○○ | 9.58 | 0.24 | Δ | 337 | ○ |
| Ex40 | 3878 | ○○ | 8.77 | 0.22 | ○ | 339 | ○ |
| Ex41 | 4129 | ○○ | 8.76 | 0.22 | ○ | 391 | ○○ |
| Ex42 | 4244 | ○○ | 8.92 | 0.22 | ○ | 371 | ○○ |

Ex = Example

TABLE 4

|  | melting point, structure state | | | | | bump hardness uader | |
|---|---|---|---|---|---|---|---|
|  | | | 99.9% | precipitate | precipitate | high temperature environment | |
|  | Solidus Line [deg C.] | Liquidus Line [deg C.] | melting judgment at 200° C. or less | average crystal grain size judgment | maximum crystal grain size judgment | surface hardness of bumps [Hv] | hardness judgment |
| Ex43 | 140 | 185 | ○ | ○ | ○○ | 11.6 | ○○ |
| Ex44 | 138 | 180 | ○ | ○ | ○○ | 9.3 | ○○ |
| Ex45 | 138 | 178 | ○ | ○ | ○○ | 10.2 | ○○ |
| Ex46 | 138 | 182 | ○ | ○ | ○○ | 9.4 | ○○ |
| Ex47 | 139 | 187 | ○ | ○ | ○○ | 9.0 | ○ |
| Ex48 | 139 | 180 | ○ | ○ | ○○ | 10.2 | ○○ |
| Ex49 | 138 | 180 | ○ | ○ | ○○ | 10.4 | ○○ |
| Ex50 | 138 | 180 | ○ | ○ | ○○ | 11.0 | ○○ |
| Comp. Ex1 | 138 | 175 | ○ | x | x | 9.0 | ○ |
| Comp. Ex2 | 141 | 196 | ○ | ○ | ○○ | 13.2 | ○○ |
| Comp Ex3 | 141 | 152 | ○ | x | x | 6.5 | x |
| Comp. Ex4 | 130 | 174 | ○ | x | x | 8.8 | ○ |
| Comp. Ex5 | 140 | 193 | ○ | x | x | 12.1 | ○○ |
| Comp. Ex6 | 140 | 145 | ○ | x | x | 6.4 | x |
| Comp. Ex7 | 141 | 183 | ○ | x | x | 9.3 | ○○ |
| Comp. Ex8 | 142 | 171 | ○ | x | ○ | 9.2 | ○○ |
| Comp. Ex9 | 141 | 210 | x | ○ | x | 11.4 | ○○ |

TABLE 4-continued

|  | | | | | | | |
|---|---|---|---|---|---|---|---|
| Comp. Ex10 | 138 | 176 | ○ | ○ | ○ | 8.9 | ○ |
| Comp. Ex11 | 138 | 177 | ○ | ○ | x | 9.0 | ○ |
| Comp. Ex12 | 138 | 173 | ○ | ○ | ○○ | 10.2 | ○○ |
| Comp. Ex13 | 142 | 463 | x | ○ | x | 10.0 | ○○ |
| Comp. Ex14 | 140 | 147 | ○ | ○ | ○ | 6.8 | x |
| Comp. Ex15 | 143 | 181 | ○ | ○ | x | 10.9 | ○○ |
| Comp. Ex16 | 143 | 444 | x | ○ | x | 8.3 | ○ |
| Comp. Ex17 | 140 | 180 | ○ | ○ | ○○ | 7.9 | ○ |
| Comp. Ex18 | 140 | 145 | ○ | x | ○ | 5.6 | x |

| | TCT resistance | | | | | EM resistance | |
|---|---|---|---|---|---|---|---|
| | Average rupture cycles [cyc] | reliability judgment | secondary Creep Rate [%/h] | (secondary creep rates)/ (Bi content (mass %)) [%/h] | creep properties with respect to Bi content judgment | EM resistance [h] | EM resistance judgment |
| Ex43 | 4281 | ○○ | 8.91 | 0.22 | ○ | 382 | ○○ |
| Ex44 | 3027 | ○ | 9.89 | 0.25 | Δ | 349 | ○ |
| Ex45 | 3765 | ○○ | 10.10 | 0.25 | Δ | 327 | ○ |
| Ex46 | 3113 | ○ | 9.77 | 0.24 | Δ | 311 | ○ |
| Ex47 | 3442 | ○ | 9.79 | 0.24 | Δ | 323 | ○ |
| Ex48 | 3665 | ○○ | 9.25 | 0.23 | ○ | 381 | ○○ |
| Ex49 | 3557 | ○○ | 9.11 | 0.23 | ○ | 341 | ○ |
| Ex50 | 4042 | ○○ | 8.88 | 0.22 | ○ | 403 | ○○ |
| Comp. Ex1 | 2420 | x | 18.21 | 0.46 | x | 249 | x |
| Comp. Ex2 | 2558 | x | 7.42 | 0.26 | x | 332 | ○ |
| Comp Ex3 | 3311 | ○ | 3.44 | 0.06 | x | 311 | ○ |
| Comp. Ex4 | 2872 | x | 19.82 | 0.50 | x | 230 | x |
| Comp. Ex5 | 2048 | x | 22.90 | 0.76 | x | 278 | x |
| Comp. Ex6 | 3538 | ○○ | 11.41 | 0.20 | x | 347 | ○ |
| Comp. Ex7 | 2544 | x | 15.30 | 0.38 | x | 269 | x |
| Comp. Ex8 | 2341 | x | 5.80 | 0.13 | ○ | 282 | x |
| Comp. Ex9 | 2963 | x | 8.10 | 0.20 | ○ | 432 | ○○ |
| Comp. Ex10 | 2881 | x | 10.21 | 0.26 | x | 313 | ○ |
| Comp. Ex11 | 3114 | ○ | 3.92 | 0.22 | ○ | 337 | ○ |
| Comp. Ex12 | 2828 | x | 10.80 | 0.26 | x | 346 | ○ |
| Comp. Ex13 | 2911 | x | 9.00 | 0.23 | ○ | 384 | ○○ |
| Comp. Ex14 | 4114 | ○○ | 2.10 | 0.04 | Δ | 316 | ○ |
| Comp. Ex15 | 3349 | ○ | 4.80 | 0.12 | ○ | 421 | ○○ |
| Comp. Ex16 | 3442 | ○ | 5.81 | 0.14 | Δ | 228 | x |
| Comp. Ex17 | 2961 | x | 12.36 | 0.31 | x | 404 | ○○ |
| Comp Ex18 | 3048 | ○ | 1.90 | 0.03 | ○ | 291 | x |

Ex = Example; Comp. Ex. = Comparative Example

As described in Table 1, in Examples 1 to 50, it was found that homogeneities of alloy structures were realized, and excellent effects were exerted on hardness, TCT resistance, and EM resistance. In particular, in Examples 4, 9, 10, 12, 13, 16, 17, 21 to 31, 33, 34, 37, 41 to 43, 48, and 50 satisfying the relations (1) to (3), superior results were obtained in each of the evaluations. Among optional elements, with respect to P, Ge, Ga, As, Co, Pd, and Pb, superior results were obtained in the respective controlled content ranges.

On the other hand, in Comparative Example 1, the additive element was only Bi, so that refinement and homogenization of the structure could not be realized, and the TCT resistance and the EM resistance were poor. In Comparative Example 2, the Bi content was small, so that the TCT resistance was poor. In Comparative Example 3, the Bi content was large, so that refinement and homogenization of the structure could not be realized, and the hardness deteriorated.

In Comparative Examples 4 to 8, the Ag content was small, so that refinement and homogenization of the structure could not be realized, and at least one of the hardness, TCT resistance, and EM resistance was poor. In Comparative Example 9, the Ag content was large, so that the structure became inhomogeneous and the melting point rose, and the TCT resistance was poor.

In Comparative Example 10, the Cu content was small, so that the TCT resistance was poor. In Comparative Example 11, the Cu content was large, so that homogenization of the structure could not be realized.

In Comparative Example 12, the Ni content was small, so that the TCT resistance was poor. In Comparative Example 13, the Ni content was large, so that the melting point rose, the structure did not become homogeneous, and the TCT resistance was poor.

In Comparative Example 14, the Sb content was small, so that the hardness was poor.

In Comparative Example 15, the Sb content was large, so that homogenization of the structure could not be realized. In Comparative Example 16, the Sb content was excessively large, so that the melting point rose, the structure did not become homogenous, and the EM resistance was poor.

In Comparative Example 17, In was contained, so that the TCT resistance was poor. In Comparative Example 18, In was contained and further the Ag content was small, so that the structure did not become homogenous, and the hardness and the EM resistance were poor.

Examples and comparative examples are arbitrarily extracted among solder alloys described in Table 1 and Table 2, and details of measurement results will be described with reference to the drawings. FIG. 3 is cross-sectional photographs of solder joints made of solder balls having alloy compositions of Example 4, Example 7, Comparative Example 4, and Comparative Example 5, FIG. 3A is a cross-sectional photograph of Example 4 taken at a magnification of 350, FIG. 3B is a cross-sectional photograph of Example 4 taken at a magnification of 2000, FIG. 3C is a cross-sectional photograph of Example 7 taken at a magnification of 350, FIG. 3D is a cross-sectional photograph of Example 7 taken at a magnification of 2000, FIG. 3E is a cross-sectional photograph of Comparative Example 4 taken at a magnification of 350, FIG. 3F is a cross-sectional photograph of Comparative Example 4 taken at a magnification of 2000, FIG. 3G is a cross-sectional photograph of Comparative Example 5 taken at a magnification of 350, and FIG. 3H is a cross-sectional photograph of Comparative Example 5 taken at a magnification of 2000. As is clear from FIG. 3, in Example 4 and Example 7, as indicated by white-circled portions, it was found that an average crystal grain size of the compounds was 3 to 15 μm, and a maximum crystal grain size was 5 to 20 μm. Other examples were also found to show similar results. On the other hand, in Comparative Example 4 and Comparative Example 5, as indicated by large white-circled portions, an average crystal grain size of the compounds was found to be less than 3 μm.

In FIG. 3, electrodes are 1, 4, 5, 8, 10, 12, 14, and 16, compounds are 2, 7, 9, and 13, solder balls are 3, 6, 11, and 15.

Results of Vickers hardness measurements of solder bumps having the alloy compositions of Example 4, Comparative Example 4, and Comparative Example 6 are shown. FIG. 4 is top face photographs of samples of solder bumps made of the solder alloys of Example 4, Comparative Example 4, and Comparative Example 6, subjected to Vickers hardness measurement, and FIG. 4A is Example 4, FIG. 4B is Comparative Example 4, and FIG. 4C is Comparative Example 6. As thus indicated, Example 4 in which the Vickers hardness was high was found to have a small indentation 17 area and show high hardness. Results of five measurements described above made for each composition are indicated in FIG. 5. As is clear from FIG. 5, they have sufficient significant differences even in consideration of variation among samples, and Example 4 was found to show high hardness at a high temperature. Other examples were also found to show similar results.

Figure 6:
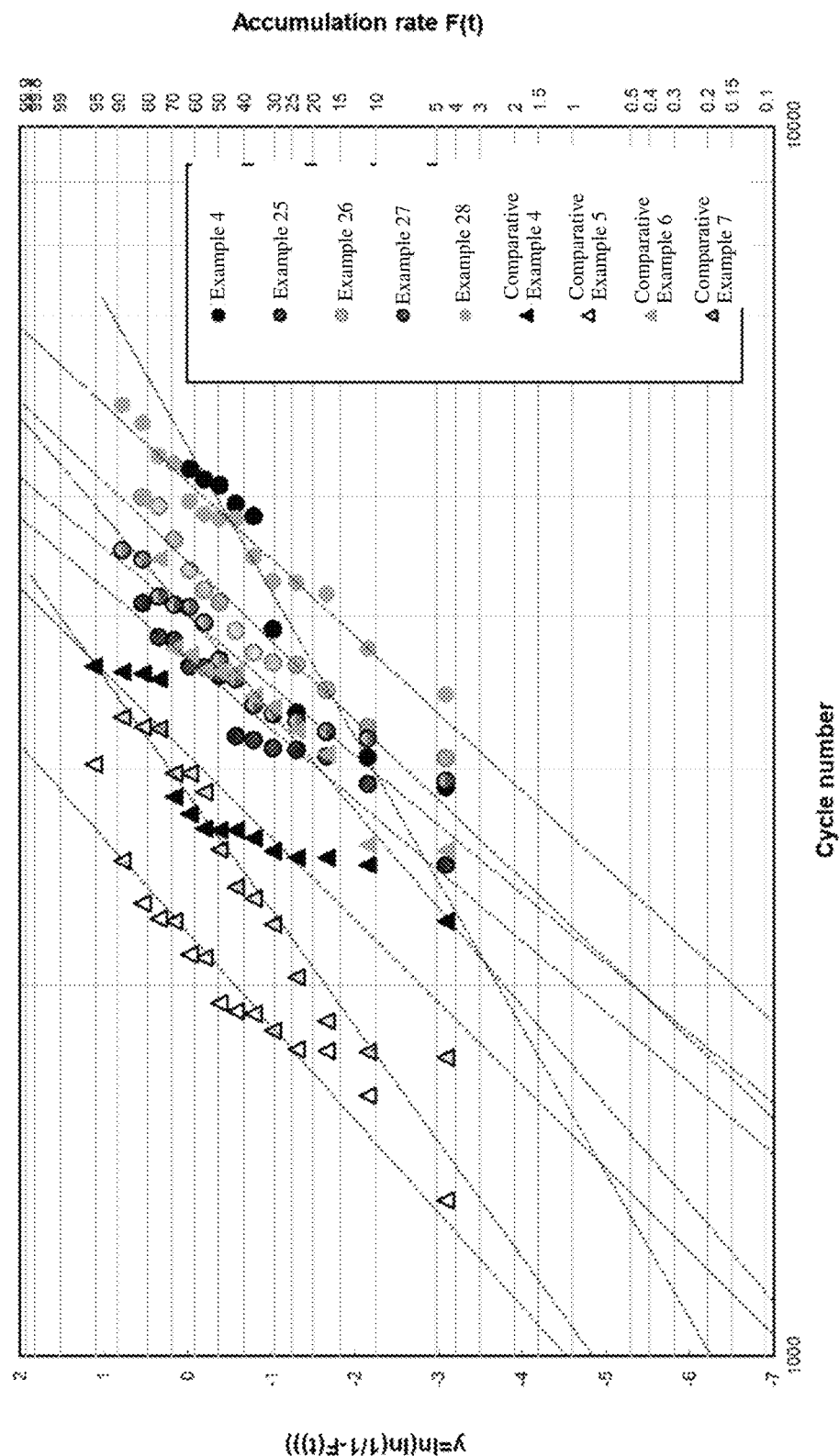
FIG. 6 is a diagram illustrating Weibull plots of heat cycle test results of Example 4, Examples 25 to 28, and Comparative Examples 4 to 7.
Figure 7:
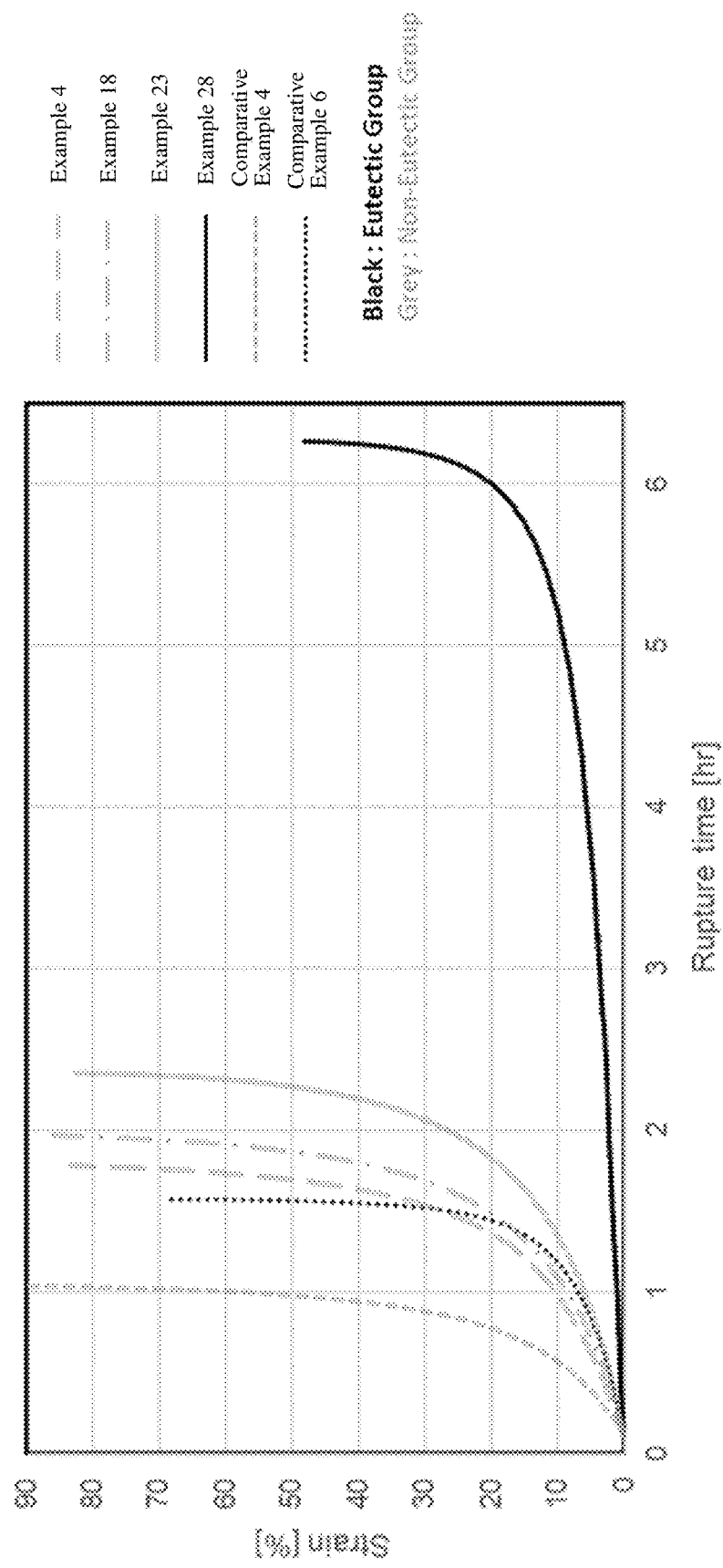
FIG. 7 is a diagram illustrating creep curves in secondary creep regions of Example 4, Example 18, Example 23, Example 28, Comparative Example 4, and Comparative Example 6.

Next, results of heat cycle tests and results of measurements of secondary creep regions are respectively indicated in FIGS. 6 and 7. As indicated in FIG. 6, it was found that, in each of Examples 4 and 25 to 28, the number of cycles was large, and the reliability was excellent as compared with Comparative Examples 4 to 7. As indicated in FIG. 7, it was found that, as compared with Comparative Examples 4 and 6, in each of Examples 4, 18, 23, and 28, a slope of the creep curve in the secondary creep region was small, so that the secondary creep rate was low. Other examples were also found to show similar results. Therefore, the examples were found to show high reliability.

Figure 8:
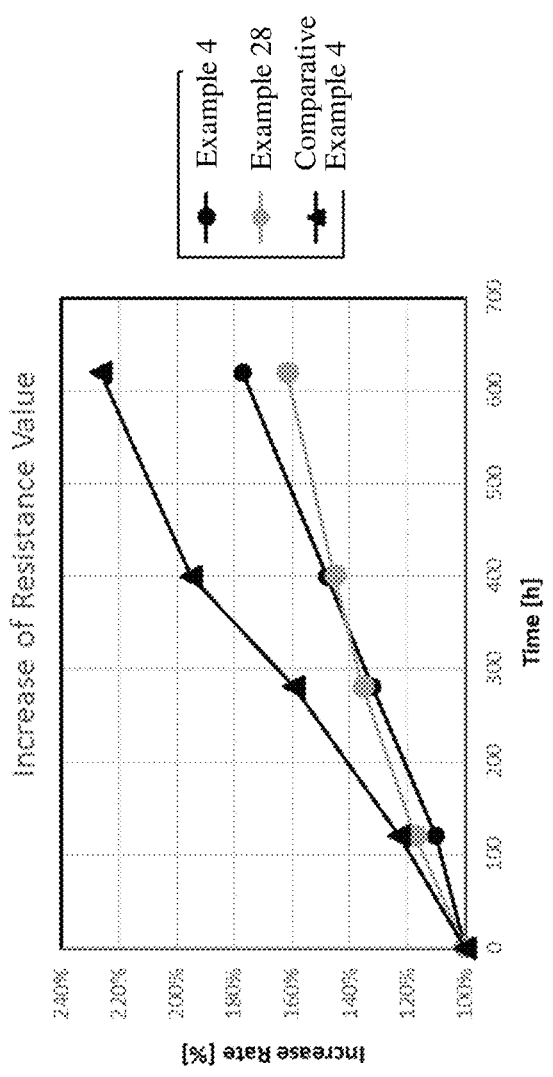
FIG. 8 is a diagram illustrating EM resistance test results of Example 4, Example 28, and Comparative Example 4.

Next, results of EM resistance tests are indicated in FIGS. 8 and 9. As is clear from FIG. 8, it was found that, in each of Examples 4 and 28, an increase in resistance value was suppressed as compared with Comparative Example 4. Other examples were also found to show similar results. Therefore, it was found that occurrence of EM was suppressed in the examples even when a large current was supplied.

Cross-sectional photographs of these samples before energization and after 700 hours elapsed from the start of energization are indicated in FIG. 9. FIG. 9 is cross-sectional photographs of solder joints made of solder balls having the alloy compositions of Example 4, Example 28, and Comparative Example 4 before and after an EM resistance test, FIG. 9A is a cross-sectional photograph of Comparative Example 4 before energization, FIGS. 9B and 9C respectively are cross-sectional photographs of Comparative Example 4 after 700-hour energization, FIG. 9D is a cross-sectional photograph of Example 4 before energization, FIGS. 9E and 9F are respectively cross-sectional photographs of Example 4 after 700-hour energization, FIG. 9G is a cross-sectional photograph of Example 28 before energization, and FIGS. 9H and 9I are respectively cross-sectional photographs of Example 28 after 700-hour energization. In FIG. 9, a white portion indicates Bi, and a gray portion indicates Sn. Each of FIGS. 9B, 9E, and 9H indicates migration of electrons from the upper side to the lower side in the photograph as indicated in FIG. 9B, and each of FIGS. 9C, 9F, and 9I indicates migration of electrons from the lower side to the upper side in the photograph as indicated in FIG. 9C.

It was found that, as compared with the photographs before energization indicated in FIG. 9A to 9C, Bi accumulated at the lower side of each photograph in FIGS. 9B, 9E, and 9H. On the other hand, it was found that, as compared with FIG. 9B indicating Comparative Example 4, a dispersed state of Bi was maintained, and migration of Bi was suppressed in each of FIG. 9E indicating Example 4 and FIG. 9H indicating Example 28. Similarly, in FIGS. 9C, 9F, and 9I in which the electron migration direction is reverse, it was found that a dispersed state of Bi was maintained, and migration of Bi was suppressed in each of FIG. 9F indicating Example 4 and FIG. 9I indicating Example 28 as compared with FIG. 9C illustrating Comparative Example 4.

The invention claimed is:

1. A solder alloy having an alloy composition consisting of, by mass %,
   Bi: 30 to 60%,
   Ag: 0.7 to 2.0%,
   Cu: more than 0% and 1.00% or less,
   Ni: 0.01 to 1.00%,
   Sb: 0.2 to 1.5%, with the balance being Sn,
   wherein the solder alloy exhibits the following properties:
   a melting rate in which 99.9% has melted before reaching 200° C., wherein the melting rate is judged based on an area ratio of a DSC curve and is a value obtained by dividing reaction calories necessary for complete melting by reaction calories completed before reaching 200° C., and multiplying the result of dividing by 100;
   an average surface hardness of 7.0 Hv or more, wherein the average surface hardness is determined by measuring surface hardness of 5 bumps that are subjected to a load of 1.96N for 60 seconds at 110° C.;
   an average number of heat cycles until rupture of at least 3,000, wherein the heat cycles include a low temperature of −40° C., a high temperature of +100° C., and a holding time of 10 minutes, wherein determining the average number of cycles until rupture includes subjecting test substrates to the heat cycles, monitoring resistance values using a daisy chain circuit, and judging that rupture has occurred when a resistance value increase of over 200% is reached from the start of the test, wherein the test substrates are prepared by placing solder balls with a diameter of 0.24 mm on electrodes of a substrate on which a soldering flux comprising a solvent, an activator, a thixotropic agent, and an organic acid was applied, mounting BGA components, and performing reflow soldering under conditions of a maximum temperature of 190° C. and a holding time of 90 seconds; and
   an electromigration resistance in which at least 300 hours elapses until the electrical resistance increases by 150% compared with an initial electrical resistance value, wherein the electrical resistance is determined by connecting a test substrate to a variable switching power supply and applying a current in a silicon oil bath held at 110° C. and continuously measuring the electrical resistance, wherein the test substrate is prepared by fabricating a package using solder balls with a diameter of 0.24 mm made of the solder alloy by performing reflow soldering on a package substrate with a size of 12 mm×12 mm including Cu electrodes with a diameter of 0.24 mm by using a water-soluble flux, printing solder paste on a glass epoxy substrate with a size of 29 mm×19 mm and a thickness of 0.8 mm, and mounting the fabricated package to the glass epoxy substrate using reflow soldering under conditions of a maximum temperature of 190° C. and a holding time of 90 seconds to fabricate the test substrate.

2. A solder alloy having an alloy composition consisting of, by mass %,
   Bi: 30 to 60%,
   Ag: 0.7 to 2.0%,
   Cu: more than 0% and 1.00% or less,
   Ni: 0.01 to 1.00%,
   Sb: 0.2 to 1.5%, and
   at least one selected from the group consisting of,
      at least one of P, Ge, Ga, and As: 0.1% or less in total,
      at least one of Fe and Co: 0.1% or less in total,
      Pd: 0.1% or less,
      Zr: 0.1% or less,
      Zn: 0.1% or less, and
      Pb: 0.02% or less,
   with the balance being Sn,
   wherein the solder alloy exhibits the following properties:
   a melting rate in which 99.9% has melted before reaching 200° C., wherein the melting rate is judged based on an area ratio of a DSC curve and is a value obtained by dividing reaction calories necessary for complete melting by reaction calories completed before reaching 200° C., and multiplying the result of dividing by 100;
   an average surface hardness of 7.0 Hv or more, wherein the average surface hardness is determined by measuring surface hardness of 5 bumps that are subjected to a load of 1.96N for 60 seconds at 110° C.;
   an average number of heat cycles until rupture of at least 3,000, wherein the heat cycles include a low temperature of −40° C., a high temperature of +100° C., and a holding time of 10 minutes, wherein determining the average number of cycles until rupture includes subjecting test substrates to the heat cycles, monitoring resistance values using a daisy chain circuit, and judging that rupture has occurred when a resistance value increase of over 200% is reached from the start of the test, wherein the test substrates are prepared by placing solder balls with a diameter of 0.24 mm on electrodes of a substrate on which a soldering flux comprising a solvent, an activator, a thixotropic agent, and an organic acid was applied, mounting BGA components, and performing reflow soldering under conditions of a maximum temperature of 190° C. and a holding time of 90 seconds; and
   an electromigration resistance in which at least 300 hours elapses until the electrical resistance increases by 150% compared with an initial electrical resistance value, wherein the electrical resistance is determined by connecting a test substrate to a variable switching power supply and applying a current in a silicon oil bath held at 110° C. and continuously measuring the electrical resistance, wherein the test substrate is prepared by fabricating a package using solder balls with a diameter of 0.24 mm made of the solder alloy by performing reflow soldering on a package substrate with a size of 12 mm×12 mm including Cu electrodes with a diameter of 0.24 mm by using a water-soluble flux, printing solder paste on a glass epoxy substrate with a size of 29 mm×19 mm and a thickness of 0.8 mm, and mounting the fabricated package to the glass epoxy substrate using reflow soldering under conditions of a maximum temperature of 190° C. and a holding time of 90 seconds to fabricate the test substrate.

3. A solder alloy having an alloy composition consisting of, by mass %,
Bi: 30 to 60%,
Ag: 0.7 to 2.0%,
Cu: more than 0% and 1.00% or less,
Ni: 0.01 to 1.00%,
Sb: 0.2 to 1.5%, and
at least one selected from the group consisting of,
P: less than 0.01%,
Ge: 0.01% or less,
Ga: less than 0.01%,
As: more than 0.001% and 0.01% or less,
Co: less than 0.01%,
Pd: 0.01% or less, and
Pb: less than 0.004%,
with the balance being Sn,
wherein the solder alloy exhibits the following properties:
a melting rate in which 99.9% has melted before reaching 200° C., wherein the melting rate is judged based on an area ratio of a DSC curve and is a value obtained by dividing reaction calories necessary for complete melting by reaction calories completed before reaching 200° C., and multiplying the result of dividing by 100;
an average surface hardness of 7.0 Hv or more, wherein the average surface hardness is determined by measuring surface hardness of 5 bumps that are subjected to a load of 1.96N for 60 seconds at 110° C.;
an average number of heat cycles until rupture of at least 3,000, wherein the heat cycles include a low temperature of −40° C., a high temperature of +100° C., and a holding time of 10 minutes, wherein determining the average number of cycles until rupture includes subjecting test substrates to the heat cycles, monitoring resistance values using a daisy chain circuit, and judging that rupture has occurred when a resistance value increase of over 200% is reached from the start of the test, wherein the test substrates are prepared by placing solder balls with a diameter of 0.24 mm on electrodes of a substrate on which a soldering flux comprising a solvent, an activator, a thixotropic agent, and an organic acid was applied, mounting BGA components, and performing reflow soldering under conditions of a maximum temperature of 190° C. and a holding time of 90 seconds; and
an electromigration resistance in which at least 300 hours elapses until the electrical resistance increases by 150% compared with an initial electrical resistance value, wherein the electrical resistance is determined by connecting a test substrate to a variable switching power supply and applying a current in a silicon oil bath held at 110° C. and continuously measuring the electrical resistance, wherein the test substrate is prepared by fabricating a package using solder balls with a diameter of 0.24 mm made of the solder alloy by performing reflow soldering on a package substrate with a size of 12 mm×12 mm including Cu electrodes with a diameter of 0.24 mm by using a water-soluble flux, printing solder paste on a glass epoxy substrate with a size of 29 mm×19 mm and a thickness of 0.8 mm, and mounting the fabricated package to the glass epoxy substrate using reflow soldering under conditions of a maximum temperature of 190° C. and a holding time of 90 seconds to fabricate the test substrate.

4. The solder alloy according to claim 1, wherein the alloy composition satisfies at least one of the following relations (1) to (3):

$13.00 \leq Bi/(Ag+Cu+Ni+Sb) \leq 23.27$       Relation (1)

$0.017 \leq (Ag+Cu+Ni)/Sn \leq 0.039$       Relation (2)

$70.9 \leq (Bi+Ag+Sb)/(Cu+Ni) \leq 6349$       Relation (3)

wherein Sn, Bi, Ag, Cu, Ni, and Sb in the relations (1) to (3) each represent the contents mass % thereof in the solder alloy.

5. A solder ball consisting of the solder alloy according to claim 1.

6. A solder paste comprising a solder powder comprising the solder alloy according to claim 1.

7. A solder joint comprising the solder alloy according to claim 1.

8. The solder alloy according to claim 2, wherein the alloy composition satisfies at least one of the following relations (1) to (3):

$13.00 \leq Bi/(Ag+Cu+Ni+Sb) \leq 23.27$       (1)

$0.017 \leq (Ag+Cu+Ni)/Sn \leq 0.039$       (2)

$70.9 \leq (Bi+Ag+Sb)/(Cu+Ni) \leq 6349$       (3)

wherein Sn, Bi, Ag, Cu, Ni, and Sb in the relations (1) to (3) each represent the contents mass % thereof in the solder alloy.

9. A solder ball consisting of the solder alloy according to claim 2.

10. A solder paste comprising a solder powder consisting of the solder alloy according to claim 2.

11. A solder joint comprising the solder alloy according to claim 2.

* * * * *